(12) United States Patent
Gartstein et al.

(10) Patent No.: US 6,198,250 B1
(45) Date of Patent: *Mar. 6, 2001

(54) PRIMARY BATTERY HAVING A BUILT-IN CONTROLLER TO EXTEND BATTERY RUN TIME

(75) Inventors: Vladimir Gartstein; Dragan Danilo Nebrigic, both of Cincinnati, OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,192

(22) Filed: Apr. 2, 1998

(51) Int. Cl.[7] .......................... H01M 10/74; H01M 10/46
(52) U.S. Cl. .............................................. 320/112
(58) Field of Search .................. 320/100, 107, 320/112, 135, 166, FOR 102, FOR 112, FOR 148

(56) References Cited

U.S. PATENT DOCUMENTS

| | | | |
|---|---|---|---|
| 4,084,124 | 4/1978 | Kapustka | 320/9 |
| 4,105,962 | 8/1978 | Scott Jr. et al. | 320/32 |
| 4,121,115 | 10/1978 | de Méré | 307/150 |
| 4,209,736 | 6/1980 | Reidenbach | 320/22 |
| 4,289,836 | 9/1981 | Lemelson | 429/61 |
| 4,296,461 | 10/1981 | Mallory et al. | 363/22 |
| 4,433,278 | 2/1984 | Lowndes et al. | 320/48 |
| 4,451,743 | 5/1984 | Suzuki et al. | 307/110 |
| 4,542,330 | 9/1985 | Terbrack | 323/222 |
| 4,553,081 | 11/1985 | Koenck | 320/43 |
| 4,563,627 | 1/1986 | Orban | 320/19 |

(List continued on next page.)

FOREIGN PATENT DOCUMENTS

| | | | |
|---|---|---|---|
| 0 546 872 | 6/1993 | (EP) | H02J/27/02 |
| 0 653 798 | 5/1995 | (EP) | H01M/10/46 |
| 0 653 841 | 5/1995 | (EP) | H03K/17/16 |
| 0 624 944 | 7/1998 | (EP) | H02J/7/36 |
| 2 270 793 | 3/1994 | (GB) | H01M/10/44 |
| 61-294754 | 12/1986 | (JP) | H01M/2/02 |
| 10-262365 | 9/1998 | (JP) | H02M/3/155 |
| 10-284099 | 10/1998 | (JP) | H02M/8/04 |
| 10-285809 | 10/1998 | (JP) | H02J/7/00 |
| 10-285820 | 10/1998 | (JP) | H02J/7/10 |
| 726608 | 5/1980 | (RU) | H01M/10/48 |
| WO 93/23887 | 11/1993 | (WO) | H01M/8/10 |
| WO 94/00888 | 1/1994 | (WO) | H01M/10/48 |
| WO 97/13189 | 4/1997 | (WO) | G06F/1/26 |
| WO 97/18588 | 5/1997 | (WO) | H01L/27/02 |

OTHER PUBLICATIONS

Allen, Charlie, CMOS curbs the appetite of power–hunger dc–dc converter chips, Electronic Design, Nov. 14, 1985, pp. 175–179.

(List continued on next page.)

Primary Examiner—Edward H. Tso
(74) Attorney, Agent, or Firm—Thomas J. Osborne, Jr.; Bart S. Hersko

(57) ABSTRACT

A battery having a built-in controller is disclosed that extends the run time of the battery. The controller may extend the run time of the battery, for example, by converting the cell voltage to an output voltage that is greater than a cut-off voltage of an electronic device, by converting the cell voltage to an output voltage that is less than the nominal voltage of the electrochemical cell of the battery, or by protecting the electrochemical cell from current peaks. The controller may also include a ground bias circuit that provides a virtual ground so that a converter may operate at lower cell voltages. The battery may be a single-cell battery, a universal single-cell battery, a multiple-cell battery or a multiple-cell hybrid battery.

31 Claims, 13 Drawing Sheets

U.S. PATENT DOCUMENTS

| | | | |
|---|---|---|---|
| 4,611,161 | 9/1986 | Barker | 320/2 |
| 4,633,379 | 12/1986 | Oda et al. | 363/19 |
| 4,686,444 | 8/1987 | Park | 320/31 |
| 4,716,354 | 12/1987 | Hacker | 320/39 |
| 4,727,006 | 2/1988 | Malinowski et al. | 429/50 |
| 4,737,702 | 4/1988 | Koenck | 320/40 |
| 4,771,226 | 9/1988 | Jones | 323/303 |
| 4,816,737 | 3/1989 | Delmas et al. | 320/35 |
| 4,818,928 | 4/1989 | Schosser | 320/2 |
| 4,845,419 | 7/1989 | Hacker | 320/39 |
| 4,998,056 | 3/1991 | Cole | 320/35 |
| 5,006,881 * | 4/1991 | Kodama . | |
| 5,032,825 | 7/1991 | Kuznicki | 340/636 |
| 5,045,768 | 9/1991 | Pelly | 320/2 |
| 5,161,097 | 11/1992 | Ikeda | 363/124 |
| 5,168,206 | 12/1992 | Jones | 320/31 |
| 5,204,608 | 4/1993 | Koenck | 320/2 |
| 5,206,097 | 4/1993 | Burns et al. | 429/90 |
| 5,216,371 | 6/1993 | Nagai | 324/428 |
| 5,245,269 | 9/1993 | Tooley et al. | 320/45 |
| 5,247,238 | 9/1993 | Yang | 320/35 |
| 5,248,929 | 9/1993 | Burke | 320/48 |
| 5,258,239 | 11/1993 | Kobayashi | 429/27 |
| 5,264,301 | 11/1993 | Sindorf et al. | 429/53 |
| 5,280,420 | 1/1994 | Rapp | 363/60 |
| 5,296,765 | 3/1994 | Williams et al. | 307/572 |
| 5,304,431 | 4/1994 | Schumm, Jr. | 429/27 |
| 5,339,236 | 8/1994 | Tamagawa | 363/59 |
| 5,343,088 | 8/1994 | Jeon | 307/296.2 |
| 5,355,073 | 10/1994 | Nguyen | 320/15 |
| 5,394,365 | 2/1995 | Tsukikawa | 365/189.09 |
| 5,446,367 | 8/1995 | Pinney | 323/266 |
| 5,449,569 | 9/1995 | Schumm, Jr. | 429/27 |
| 5,451,533 * | 9/1995 | Williams et al. . | |
| 5,499,183 | 3/1996 | Kobatake | 363/59 |
| 5,541,016 | 7/1996 | Schumm, Jr. | 429/27 |
| 5,541,489 | 7/1996 | Dunstan | 320/2 |
| 5,541,490 | 7/1996 | Sengupta et al. | 320/14 |
| 5,550,452 | 8/1996 | Shirai et al. | 320/2 |
| 5,557,188 | 9/1996 | Piercey | 320/5 |
| 5,560,999 | 10/1996 | Pedicini et al. | 429/27 |
| 5,561,361 | 10/1996 | Sengupta et al. | 320/14 |
| 5,563,004 | 10/1996 | Buzzelli et al. | 429/27 |
| 5,565,759 | 10/1996 | Dunstar | 320/48 |
| 5,583,415 | 12/1996 | Fernandez et al. | 320/15 |
| 5,590,419 | 12/1996 | Shimo | 455/127 |
| 5,591,212 | 1/1997 | Keimel | 607/5 |
| 5,592,069 | 1/1997 | Dias et al. | 320/30 |
| 5,600,230 | 2/1997 | Dunstan | 320/48 |
| 5,606,242 | 2/1997 | Hull et al. | 320/48 |
| 5,610,450 | 3/1997 | Saeki et al. | 307/46 |
| 5,619,430 | 4/1997 | Nolan et al. | 364/557 |
| 5,633,573 | 5/1997 | van Phuoc et al. | 320/5 |
| 5,645,949 | 7/1997 | Young | 429/7 |
| 5,646,508 | 7/1997 | van Phuoc et al. | 320/30 |
| 5,656,876 | 8/1997 | Radley et al. | 307/150 |
| 5,675,322 | 10/1997 | Koenck | 320/2 |
| 5,689,178 | 11/1997 | Otake | 323/282 |
| 5,694,024 | 12/1997 | Dias et al. | 320/2 |
| 5,710,501 | 1/1998 | Van Phuoc et al. | 320/2 |
| 5,714,863 | 2/1998 | Hwang et al. | 320/1 |
| 5,731,686 | 3/1998 | Malhi | 320/35 |
| 5,747,189 | 5/1998 | Perkins | 429/91 |
| 5,767,659 | 6/1998 | Farley | 320/106 |
| 5,783,322 | 7/1998 | Nagai et al. | 429/7 |
| 5,825,156 | 10/1998 | Patillion et al. | 320/21 |
| 5,831,418 | 11/1998 | Kitagawa | 323/222 |
| 5,837,394 | 11/1998 | Schumm, Jr. | 429/27 |
| 5,864,182 * | 1/1999 | Matsuzaki . | |
| 5,923,544 | 7/1999 | Urano | 363/22 |

OTHER PUBLICATIONS

Allen, Charlie, DC/DC chip for low power circuit efficiency, Electronic Product Design, Aug. 1996, pp. 29–32.

Arbetter, Barry and Maksimovic, Dragan, Control Method for Low–Voltage DC Power Supply in Battery–Powered Systems with Power Management, IEEE 1997, pp. 1198–1204.

Goodenough, Frank, Off–Line and One–Cell IC Converters Up Efficiency, Electronic Design, Jun. 27, 1994, pp. 55–64.

Iwata, T. Yamauchi, H. Akamatsu, Y. Terada, A. Matsuzawa, Gate–Over Driving CMOS Architecture for 0.5V Single––Power–Supply–Operated Devices, IEEE 1997, pp. 290–291 and 473.

McClure, M., Constant Input Power Modulation Technique for High Efficiency Boost Converter Optimized for Lithium–Ion Battery Applications, IEEE 1996, pp. 850–55.

Mohandes, B., MOSFET Synchronous Rectifiers Achieve 90& Efficiency –Part II, PCIM, Jul. 1991 pp. 55–61.

Moore, B., Regulator topologies standardize battery–powered systems, EDN, Jan. 20, 1994, pp. 59–64.

Neil, C., Smart Battery Power, Australian Electronics Engineering, Apr. 1996, pp. 34–38.

Travis, B., Low–voltage power sources keep pace with plummeting logic and $\mu$P voltages, EDN, Sep. 26, 1996, pp. 51–62.

Williams, R. Mohandes, B. and Lee, C., High–Frequency DC/Dc Converter for Lithium–Ion battery Applications Utilizes Ultra–Fast CBiC/D Process Technology, IEEE 1995, pp. 322–332.

Yamauchi, H, Iwata, T., Akamatus, H. and Matsuzawa, A., A 0.5V/100MHz Over–Vcc Grounded Data Storage (OVGS) SRAM Cell Architecture With Boosted Bit–line and offset Source Over–Driving Schemes, 1996 International Symposium on Low Power Electronics and Design, Aug. 12–14, 1996, pp. 49–54.

Zhou, X., Wang, T. and Lee, F., Optimizing Design for Low voltage DC–DC Converters, IEEE 1997, pp. 612–616.

Aguilar, C., Canales, F., Arau, J., Sebastian, J. and Uceda, J., An Integrated Battery Charger/Discharger with Power–Factor Correction, IEEE Transactions on Industrial Electronics, Oct. 1997, pp. 597–603.

Favrat, P., Paratte, L. Ballan, H. Declercq, M. and deRooij, N., A 1.5–V–Supplied CMOS ASIC for the Actuation of an Electrostatic Micromotor, IEEE/ASME Transactions on Mechatronics, Sep. 1997, pp. 153–160.

Wolfgang, G. and Lindemann, R., New Topology for High Efficient DC/Dc Conversion, Power Conversion, May 1996, pp. 503–512.

Lachs, W., Sutanto, D. and Logothetis, D., Power System Control in the Next Century, IEEE Transactions on Power Systems, Feb. 1996, pp. 11–18.

Wells, Eddy, Integrated Boost Controller Extends alkaline usage, Electronic Design, Nov. 17, 1997, v. 45, No. 25, p.S54(1).

Stratakos, Anthony, High–Efficiency Low–Voltage DC–DC Conversion for Portable Applications, University of California, Berkeley, Department of EECS, http://bob.eecs.berkeley.edu no date.

Alfano, Don, Dc/Dc converters for battery–operated systems: Charge pump or switcher?, Electronic Products, Aug. 1996.

Douseki, Takakuni, et al., A 0.5–V MYCMOS/SIMOX Logic Gate, IEEEE Journal of Solid–State Circuits, v.32, No. 10, pp. 1604–09, Oct. 1997.

Wang, Chi–Chang, et al., Efficiency Improvement in Charge Pump Circuits, IEEE Journal of Solid State Circuits, vol. 32, No. 6, Jun. 1997, pp. 852–60.

Sherman, Len, DC/DC converters adapt to the needs of low–power circuits, EDN, Jan. 7, 1998, pp. 145–52.

Heacock, David, and Freeman, David, Capacity Monitoring in Advanced Battery Chemistries, IEEE,1995 (0–7803–2459 May 1995).

Matsuya, Yasuyuki, et al., Low–Voltage Supply A/D, D/A Conversion Technology, Institute of Electronics, Information and Communications, Engineers Technical Report of IEICE, Aug. 1994.

Yamasaki, Mikio, et al., High–efficiency power source with low input voltage, National Meeting Fall 1989, Institute of Electronics and Communication Engineers of Japan, pp. 3–276:277.

Kida, Junzo, et al., Performance of DC–DC converter under battery load, Doshisha University, PE 90 37, Ser. No. 0005, pp. 29–35.

Tsukamoto, Kazuo, et al., Low–power dissipation technology of control circuit for battery–input–type power source, Technical Report of IEICE, PE 94–71 (1995–03), The Institute of Electronics, Information and Communication Engineers.

Copy of International Search Report dated Jul. 6, 1999.

* cited by examiner

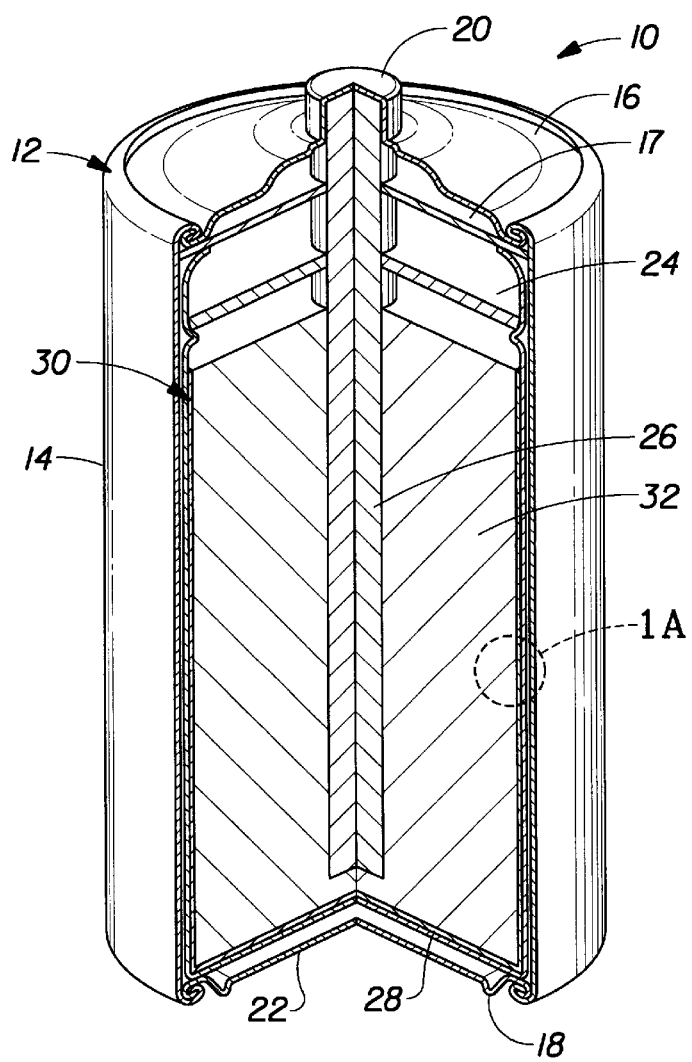
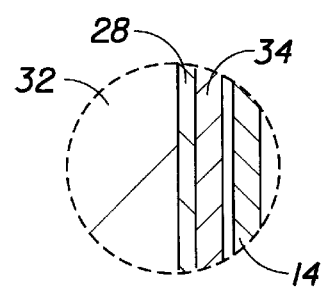
Fig. 1
Fig. 1A

PRIMARY BATTERY HAVING A BUILT-IN CONTROLLER TO EXTEND BATTERY RUN TIME

FIELD OF THE INVENTION

The present invention relates to primary batteries and more particularly to primary batteries having a built-in controller to extend the battery run time.

BACKGROUND OF THE INVENTION

Consumers use primary consumer batteries in portable electronic devices such as radios, compact disc players, cameras, cellular phones, electronic games, toys, pagers, and computer devices, etc. When the run time of these batteries is over, the batteries are usually thrown away. At this time, only about 40 to 70% of a typical battery's total storage capacity has usually been used. After that portion of the initial stored energy has been used, the battery generally cannot supply enough voltage to drive the electronic device. Thus, the consumers generally throw the batteries away even though the battery still contains between about 30 and 60% of its storage capacity. Extending the run time of these batteries by providing a safe deeper discharge may reduce waste by allowing the electronic devices to use up to the full storage capacity of the battery before throwing it away.

In addition, consumers constantly demand smaller and lighter portable electronic devices. One of the primary obstacles to making these devices smaller and lighter is the size and weight of the batteries required to power the devices. In fact, as the electronic circuits get faster and more complex, they typically require even more current than they did before, and, therefore, the demands on the batteries are even greater. Consumers, however, will not accept more powerful and miniaturized devices if the increased functionality and speed requires them to replace the batteries much more frequently. Thus, in order to build faster and more complex electronic devices without decreasing the battery run time, the electronic devices need to use the batteries more efficiently or the batteries themselves need to provide greater utilization of stored energy.

Some more expensive electronic devices include a voltage regulator circuit such as a switching converter (e.g., a DC/DC converter) in the devices for converting and/or stabilizing the output voltage of one or more batteries. In these devices, multiple single-cell batteries are generally connected in series, and the converter converts the voltage of the batteries into a voltage required by the load circuit. A converter can extend the service run time of the batteries by stepping down the battery output voltage in the initial portion of the battery discharge where the battery would otherwise supply more voltage, and therefore more power, than the load circuit requires, and/or by stepping up the battery output voltage in the latter portion of the battery discharge where the battery would otherwise be exhausted because the output voltage is less than the load circuit requires.

The approach of having the converter in the electronic device, however, has several drawbacks. First, the converters are relatively expensive to place in the electronic devices because every device manufacturer has specific circuit designs that are made in a relatively limited quantity and, thus, have a higher individual cost. Second, battery suppliers have no control over the type of converter that will be used with a particular battery. Therefore, the converters are not optimized for the specific electrochemical properties of each type of battery cell. Third, different types of battery cells such as alkaline and lithium cells have different electrochemical properties and nominal voltages and, therefore, cannot be readily interchanged. Additionally, the converters take up valuable space in and add to the weight of the electronic devices. Also, some electronic devices may use linear regulators instead of more efficient switching converters, such as DC/DC converters. In addition, electronic devices containing switching converters can create electromagnetic interference (EMI) that may adversely affect adjacent circuitry in the electronic device such as a radio frequency ("rf") transmitter. By placing the converter in the battery, however, the source of the EMI can be placed farther away from other EMI sensitive electronics and/or could be shielded by a conductive container of the battery.

Another problem with present voltage converters is that they typically need multiple electrochemical cells connected in series in order to provide enough voltage to drive the converter. Then, the converter may step the voltage down to a level required by the electronic device. Thus, due to the converter's input voltage requirements, the electronic device must contain several electrochemical cells, even though the electronic device itself may only require a single cell to operate. This results in wasted space and weight and prevents further miniaturization of the electronic devices.

Thus, needs exist to use more of primary consumer batteries' storage capacity before throwing the batteries away and to use less space and weight for the batteries in order to further miniaturize portable electronic devices.

Additionally, a need exists reduce the cost of DC/DC converters for electronic devices such as by designing more universal circuit designs.

A need also exists to design a converter that may take advantage of specific electrochemical properties of a particular type of electrochemical cell.

In addition, a need also exists for developing interchangeable batteries that have electrochemical cells with different nominal voltages or internal impedance without altering the cell chemistry of the electrochemical cells themselves.

Moreover, a need exists to develop hybrid batteries that allow the use of different types of electrochemical cells to be packaged in the same battery.

Further, a need also exists to protect sensitive circuitry of an electronic or electric device from EMI interference caused by a switching converter.

SUMMARY OF THE INVENTION

The present invention is a primary battery that provides a longer run time by using more of its stored energy. The battery has a built-in controller that includes a DC/DC converter which may be capable of operating below the voltage threshold of typical electronic devices. The controller more efficiently regulates the voltage of the cell and allows for a safe deep discharge of the battery in order to use more of the battery's stored energy. The controller is preferably disposed on a mixed-mode silicon chip that is custom designed for operation with a particular type of electrochemical cell such as an alkaline, zinc-carbon, NiCd, lithium, silver oxide or hybrid cell or with a particular electronic device.

The controller preferably monitors and controls power delivery to the load to optimally extend the run time of the battery by (1) turning on and off the DC/DC converter; (2) maintaining a minimum required output voltage when the input voltage is below the cut-off voltage of electronic devices for which the battery is intended to power; and (3) lowering the battery output impedance.

In a preferred embodiment, the controller is mounted inside a single-cell primary battery such as a standard AAA, AA, C or D battery (e.g., in the container), or inside each cell of a multiple-cell primary battery such as a standard 9 volt battery. This provides several distinct advantages. First, it allows the battery designer to take advantage of particular electrochemical characteristics of each type of electrochemical cell. Second, it allows for different types of electrochemical cells to be used interchangeably by either altering or stabilizing the output voltage and/or the output impedance to meet the requirements of the electronic devices designed to operate on a standard electrochemical cell. For example, a battery designer may design a super efficient lithium battery that contains a lithium electrochemical cell such as a lithium $MnO_2$ cell that meets the packaging and electrical requirements of a standard 1.5 volt AA battery by stepping down the nominal cell voltage in the range from about 2.8 to about 4.0 volts to about 1.5 volts without reducing the lithium cell chemical energy storage. By utilizing the higher cell voltage of a lithium cell, the designer can substantially increase the service run time of the battery. Third, placing the converter circuit in a single-cell or multiple-cell battery allows electronic devices to be designed without internal regulators or converters. This may help reduce the size of the electronics and provide cheaper, smaller and lighter portable electronic devices. In addition, a conductive container containing the electrochemical cell also provides a shielding layer around the controller circuit to protect nearby electronic circuits such as radio frequency ("rf") transmitters and receivers from electromagnetic interference ("EMI") caused by the DC/DC converter of the controller. Also, providing a controller in each electrochemical cell provides much safer and effective control over every electrochemical cell than is presently available. The controllers may monitor conditions in each electrochemical cell and ensure that each electrochemical cell is exhausted as completely as possible before the electronic device shuts down.

The controllers also allow use of the batteries of the present invention in a wide range of devices. The batteries of the present invention provide advantages over known batteries regardless of whether they are used with electric or electronic devices that have a cut-off voltage such as the ones listed above or with an electric device that does not have a cut-off voltage such as a flashlight.

The controller chips can also be made much more economically because the large volume of battery sales allows for much less expensive production of the chips than individual regulator or converter designs can be made for each type of electronic device.

One preferred embodiment of the DC/DC converter is an almost inductorless, high frequency, high efficiency, low input voltage, and medium power converter that utilizes a pulse-width and phase shift modulation control scheme.

Other features and advantages of the present invention are described with respect to the description of a preferred embodiment of the invention.

BRIEF DESCRIPTION OF THE DRAWINGS

While the specification concludes with claims particularly pointing out and distinctly claiming the subject matter that is regarded as the present invention, it is believed that the invention will be better understood from the following description, which is taken in conjunction with the accompanying drawings.

FIG. 1 is a broken-away perspective view of a typical cylindrical battery structure.

FIG. 1A is an enhanced view of a section of FIG. 1.

DETAILED DESCRIPTION OF THE INVENTION

Figure 2:
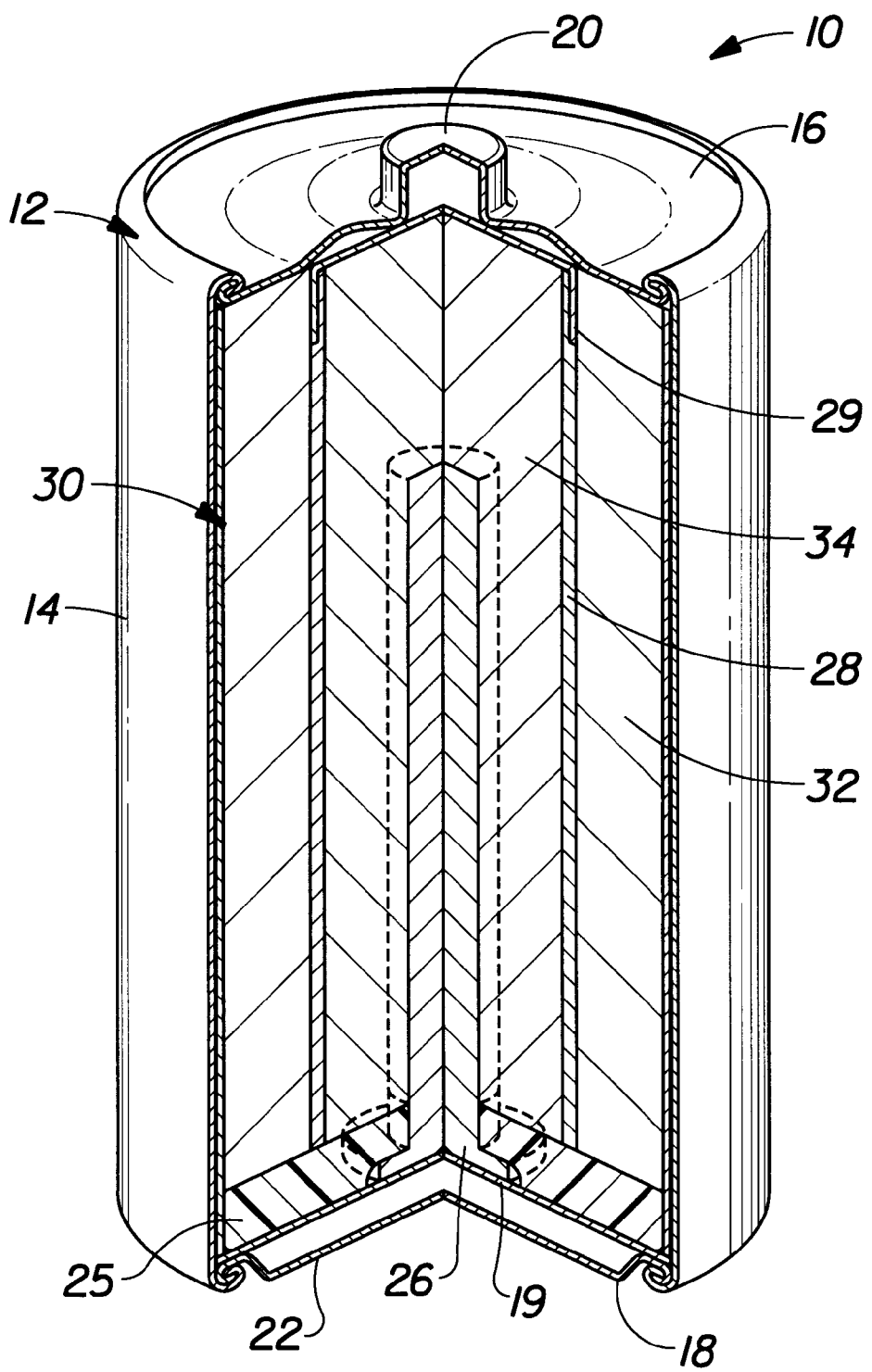
FIG. 2 is a broken-away perspective view of another typical cylindrical battery structure.

The present invention relates to primary single-cell and multiple-cell batteries. The term "primary" is used in this application and refer to a battery or an electrochemical cell that is intended to be discarded after its usable electrical storage capacity has been depleted (i.e., it is not intended to be recharged or otherwise re-used). The term "consumer" in this application refers to a battery that is intended to be used in an electronic or electric device purchased or used by a consumer. The term "single-cell" refers to a battery having a single electrochemical cell packaged individually such as a standard AA, AAA, C or D type battery, or a single-cell in a multiple-cell battery (e.g., such as a standard 9 volt battery or a battery for a cellular telephone or laptop computer). The term "battery," as used in this application, refers to a container having terminals and a single electrochemical cell, or a housing that has terminals and at least substantially contains two or more electrochemical cells (e.g., a standard 9 volt battery or a battery for a cellular telephone or laptop computer). The electrochemical cells need not be completely enclosed by the housing if each cell has its own individual container. A portable telephone battery, for example, may contain two or more electrochemical cells that each have their own individual containers and are packaged together in a shrink-wrap plastic material that holds the individual containers together but may not completely enclose the individual containers of the cells. As used in this application, the term "hybrid battery" includes a multiple-cell battery that contains two or more electrochemical cells of which at least two of those cells have different electrochemical elements such as a different electrode, a different pair of electrodes or a different electrolyte.

The term "controller" as used in this application refers to a circuit that accepts at least one input signal and provides at least one output signal that is a function of the input signal. The terms "DC/DC converter" and "converter," are used interchangeably in this application and refer to a switching-type, i.e., a chopper-controlled DC/DC converter that converts an input DC voltage to a required DC output voltage. DC/DC converters are power electronic circuits that often provide a regulated output. The converter may provide a stepped-up voltage level, a stepped-down voltage level or a regulated voltage of about the same level. Many different types of DC/DC converters are well known in the art. The present invention contemplates the use of known converters or linear regulators as possible, though less advantageous, substitutions for the preferred converters described in this application that are capable of operating at voltage levels below where typical electronic devices can operate.

The "cut-off voltage" is the voltage below which an electric or electronic device connected to a battery cannot operate. Thus, the "cut-off voltage" is device dependent, i.e., the level depends on the minimum operating voltage of the device (the functional end-point) or the frequency of operation (e.g., must be able to charge a capacitor within a given time period). Electronic devices generally have a cut-off voltage in the range from about 1 volt to about 1.2 volts, with some of the electronic devices having a cut-off voltage as low as about 0.9 volts. Electric devices that have mechanical moving parts, such as electric clocks, motors and electromechanical relays also have a cut-off voltage that is necessary to provide enough current to create an electromagnetic field strong enough to move the mechanical parts. Other electric devices, such as a flashlight, generally do not have a device cut-off voltage, but as the voltage of the battery powering it decreases, the output power (e.g., bulb intensity) will also decrease.

One aspect of the present invention is to extend the "service run time" of a battery. The "battery service run time" and the "battery run time" are interchangeable and are defined as the time of the discharge cycle until the output voltage of the battery drops below the minimum operating voltage of the device that the battery is powering, i.e., the cut-off voltage of that device. While the "cell run time" is dependent upon the electrochemical cell itself, i.e., exhausting all the electrochemical energy of the cell, the "battery run time" is dependent upon the device in which it is used. An electronic device having a cut-off voltage of about 1 volt, for example, will shut down when the battery output voltage drops below 1 volt even though the electrochemical cell may still have at least 50% of its energy storage capacity remaining. In this example, the "battery run time" has elapsed because it can no longer provide enough energy to drive the electronic device and the battery is generally thrown away. The "cell run time," however, has not elapsed because the cell has electrochemical energy remaining.

In this application, the terms "useful life of the electrochemical cell" or the "cell useful life" are also used regardless of whether the electrochemical cell is a disposable or rechargeable cell, and correspond to the battery run time in that the "cell useful life" is the time until the cell is no longer useful in a particular discharge cycle because the electrochemical cell can no longer provide enough voltage to drive the device that it is powering. If the "cell run time" in a single-cell battery is extended or reduced, then the "cell useful life" and the "battery run time" are also necessarily extended or reduced, respectively. Additionally, the terms "battery run time" of a single-cell battery and "cell useful life" are interchangeable in that if either the "battery run time" of the single-cell battery or the "cell useful life" are extended or reduced, then the other will also be respectively extended or reduced. In contrast, however, the term "cell useful life" of a particular electrochemical cell in a multiple-cell battery is not necessarily interchangeable with the term "battery run time" for that multiple-cell battery because the particular electrochemical cell may still have a remaining useful life even after the battery run time of the multiple-cell battery has elapsed. Likewise, if the "cell run time" of a particular electrochemical cell in a multiple-cell battery is extended or reduced, the "battery run time" is not necessarily extended or reduced because the "battery run time" may depend upon the cell voltage of one or more other cells in the battery.

The terms "electrically connected" and "electrical connection" refer to connections that allow for continuous current flow. The terms "electronically connected" and "electronic connection" refer to connections in which an electronic device such as a transistor or a diode are included in the current path. "Electronic connections" are considered in this application to be a subset of "electrical connections" such that while every "electronic connection" is considered to be an "electrical connection," not every "electrical connection" is considered to be an "electronic connection."

Figure 3:
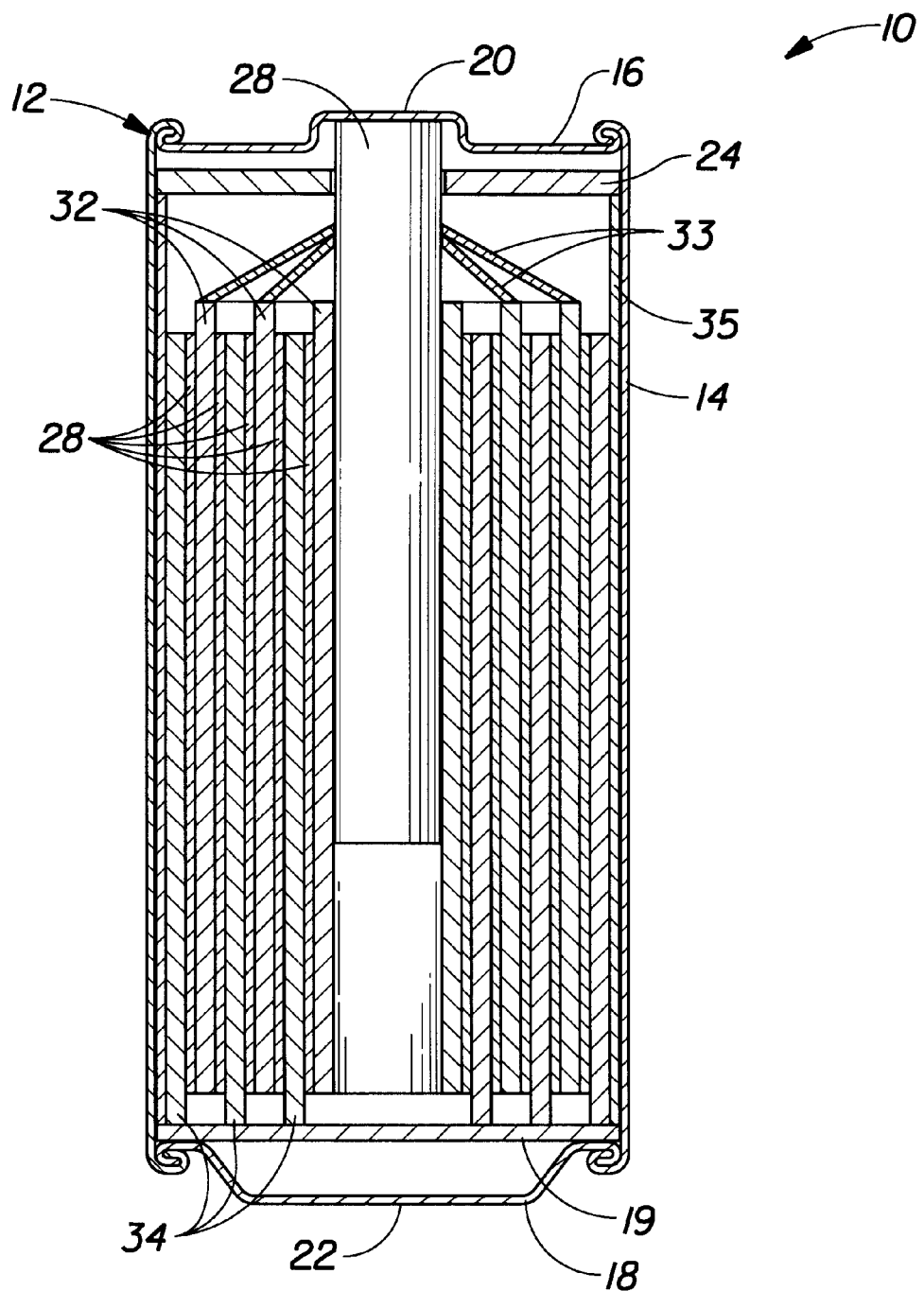
FIG. 3 is a cross-sectional view of yet another typical cylindrical battery structure.

FIGS. 1–3 show typical cylindrical battery 10 structures that are simplified for the purpose of discussion. Each cylindrical battery 10 structure has the same basic structural elements arranged in different configurations. In each case, the structure includes a container having a jacket or side wall 14, a top cap 16 including a positive terminal 20, and a bottom cap 18 including a negative terminal 22. The container 12 encloses a single electrochemical cell 30. FIG. 1 shows a configuration that may be used for a cylindrical, single zinc-carbon electrochemical cell 30 battery 10. In this configuration, the entire top cap 16 is conductive and forms the positive terminal 20 of the battery 10. The insulating washer or seal 24 insulates the conductive top cap 16 from the electrochemical cell 30. The electrode or current collector 26 electrically connects the external positive terminal 20 of the battery 10 and the cathode (positive electrode) 32 of the electrochemical cell 30. The bottom cap 18 is also entirely conductive and forms the external negative terminal 22 of the battery 10. The bottom cap is electrically connected to the anode (negative electrode) 34 of the electrochemical cell 30. Separator 28 is disposed between the anode and cathode and provides the means for ion conduction through the electrolyte. A zinc-carbon battery, for example, is typically packaged in this type of arrangement.

FIG. 2 shows an alternative battery design in which an insulating washer or seal 24 is shown insulating the bottom cap 18 from the electrochemical cell 30. In this case, the entire top cap 16 is conductive and forms the positive terminal 20 of the battery. The top cap 16 is electrically connected to the cathode 32 of the electrochemical cell 30. The bottom cap 18, which is also conductive, forms the negative terminal 22 of the battery. The bottom cap 18 is electrically connected to the anode 34 of the battery cell 30 via the current collector 26. Separator 28 is disposed between the anode and cathode and provides the means for ion conduction through the electrolyte. An alkaline (zinc/manganese dioxide) battery, for example, is typically packaged in this type of arrangement.

FIG. 3 shows another alternative battery design in which the electrochemical cell 30 is formed in a "spirally wound jelly roll" structure. In this design, four layers are disposed adjacent each other in a "laminate-type" structure. This "laminate-type" structure may, for example, contain the following order of layers: a cathode layer 32, a first separator layer 28, an anode layer 34 and a second separator layer 28. Alternatively, the second separator layer 28 that is not disposed between the cathode 32 and the anode 34 layers may be replaced by an insulating layer. This "laminate-type" structure is then rolled into a cylindrical spirally wound jelly roll configuration and placed in the container 12 of the battery 10. An insulating washer or seal 24 is shown insulating the top cap 16 from the electrochemical cell 30. In this case, the entire top cap 16 is conductive and forms the positive terminal 20 of the battery 10. The top cap 16 is electrically connected to the cathode layer 32 of the electrochemical cell 30 via current collector 26. The bottom cap 18, which is also conductive, forms the negative terminal 22 of the battery. The bottom cap 18 is electrically connected to the anode 34 of the battery cell 30 via conductive bottom plate 19. Separator layers 28are disposed between the cathode layer 32 and the anode layer 34 and provide the means for ion conduction through the electrolyte. The side wall 14 is shown connected to both the top cap 16 and the bottom cap 18. In this case, the side wall 14 is preferably formed of a non-conductive material such as a polymer. The side wall, however, may also be made of a conductive material such as a metal if the side wall 14 is insulated from at least the positive terminal 20 and/or the negative terminal 22 so that it does not create a short-circuit between the two terminals. An lithium battery such as a lithium manganese dioxide ($MnO_2$) battery, for example, is typically packaged in this type of arrangement.

Each of these cells may also include various forms of safety vents, operating vents for electrochemical cells that need air exchange for operation, capacity indicators, labels, etc., which are well known in the art. In addition, the cells may be constructed in other structures known in the art such as button cells, coin cells, prismatic cells, flat-plate or bipolar-plate cells, etc.

For the purpose of the present invention, the battery "container" 12 houses a single electrochemical cell 30. The container 12 includes all the elements necessary to insulate and protect the two electrodes 32 and 34, separator and the electrolyte of the electrochemical cell 30 from the environment and from any other electrochemical cells in a multiple-cell battery and to provide electrical energy from the electrochemical cell 30 outside of the container. Thus, the container 12 in FIGS. 1 and 2 includes a side wall 14, top 16 and bottom 18 caps, and positive 20 and negative 22 terminals that provide for electrical connection of the cell 30. In a multiple-cell battery, the container may be an individual structure that contains a single electrochemical cell 30, and this container 12 may be one of multiple individual containers within the multiple-cell battery. Alternatively, the container 12 may be formed by a portion of the housing of a multiple-cell battery if the housing completely isolates the electrodes and the electrolyte of one electrochemical cell from the environment and each other cell in the battery. The container 12 may be made of a combination of conducting material, such as metal, and insulating material, such as a plastic or a polymer.

Figure 6:
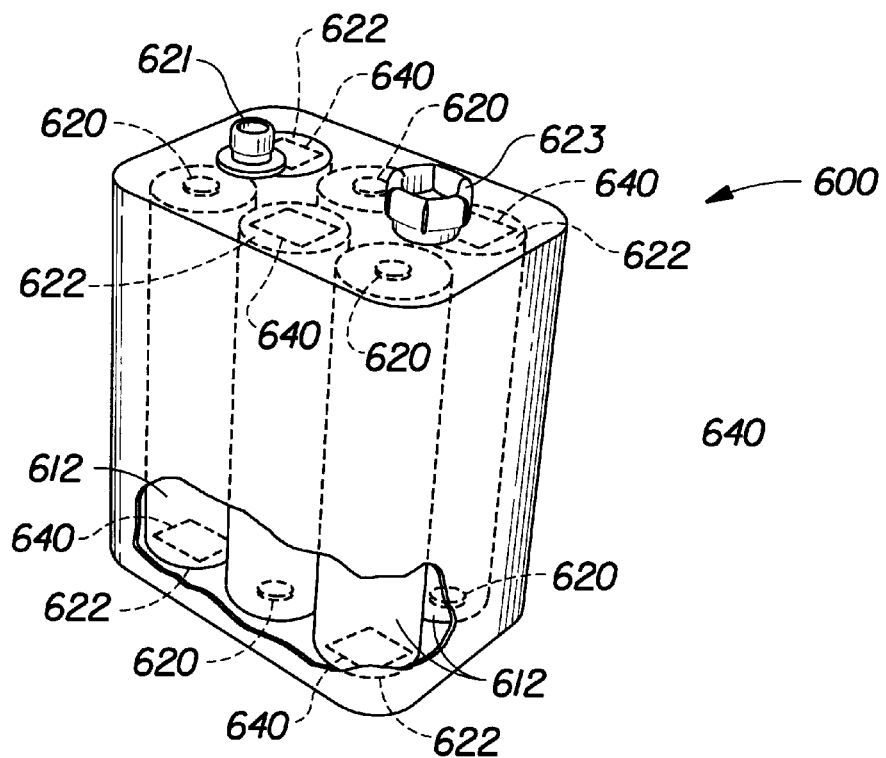
FIG. 6 is a perspective view, partially broken-away, of a preferred embodiment of a multiple-cell battery of the present invention.

The container 12, however, is to be distinguished from a multiple-cell battery housing that contains separate individually isolated cells each containing its own electrodes and electrolyte. For example, a standard alkaline 9 volt battery housing encloses six individual alkaline cells, each having their own container 612, as shown in FIG. 6. In some lithium 9 volt batteries, however, the housing of the battery is formed such that it has individual chambers that isolate the electrodes and the electrolyte of the electrochemical cells, and thus the housing comprises both the individual containers 12 for each cell and the housing for the entire battery.

Figure 5A:
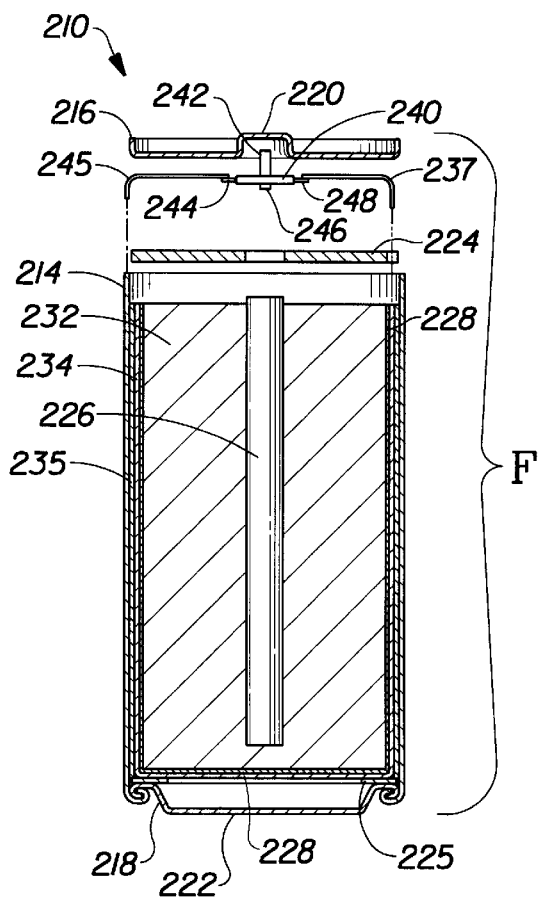
FIG. 5A is a partially exploded, cross-sectional view of a preferred embodiment of a battery of the present invention.
Figure 5B:
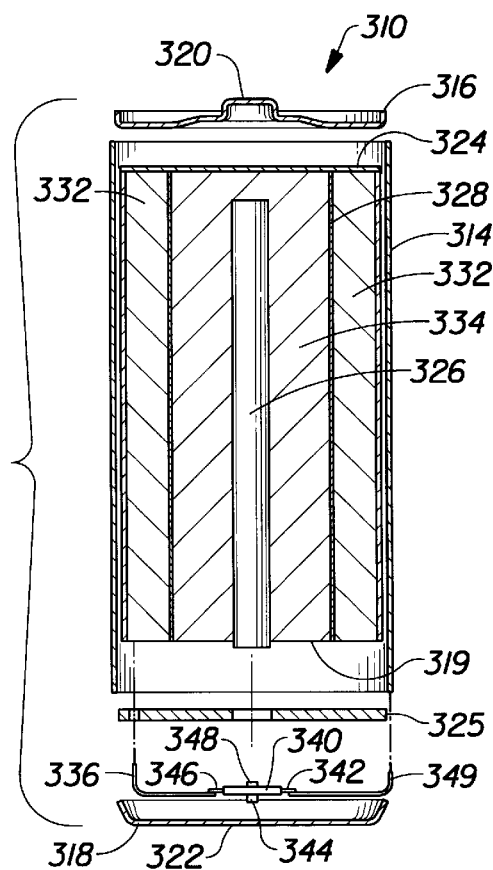
FIG. 5B is a partially exploded, cross-sectional view of another preferred embodiment of a battery of the present invention.
Figure 5C:
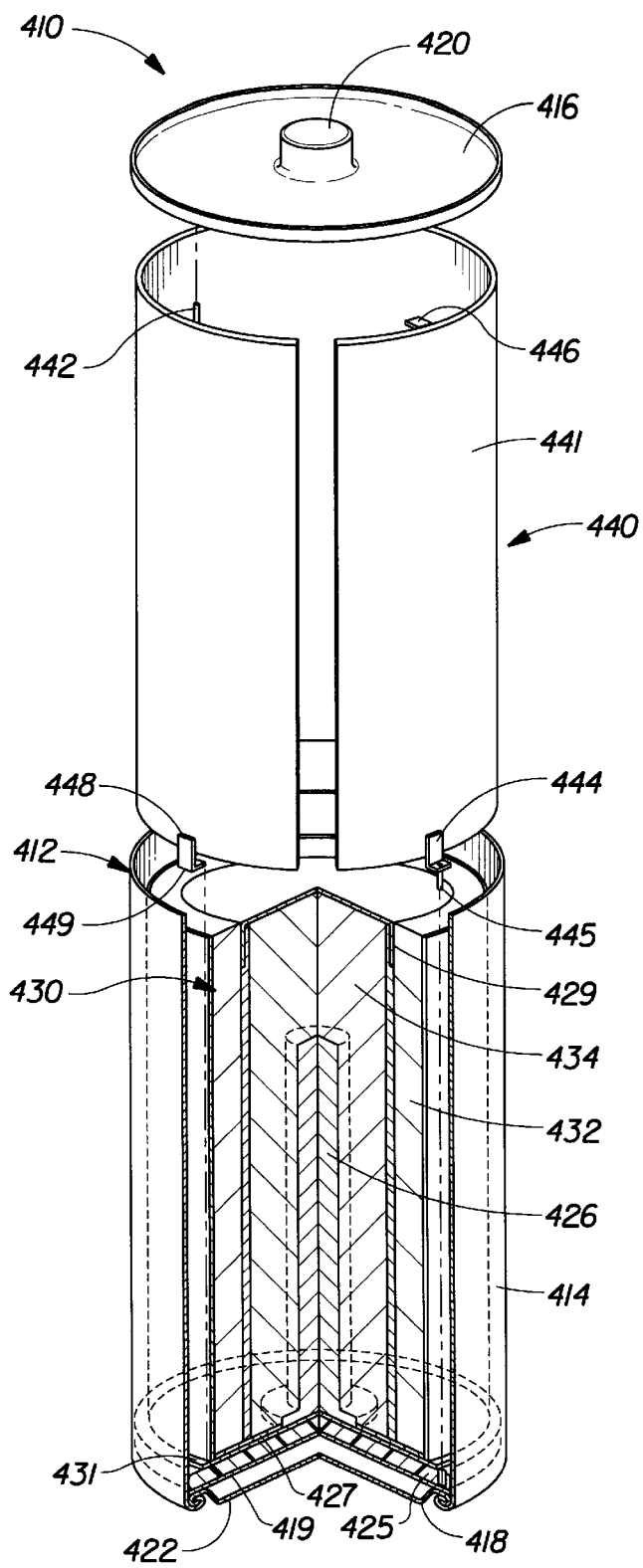
FIG. 5C is a partially exploded, broken-away perspective view of yet another preferred embodiment of a battery of the present invention.

FIGS. 5A, 5B and 5C show partially exploded views of three embodiments of the present invention for single-cell cylindrical primary batteries. In FIG. 5A, the controller 240 is placed between the top cap 216 and the insulating washer 224 of the battery 210. The positive output 242 of the controller 240 is electrically connected to the positive terminal 220 of the battery 210, which is directly adjacent to the controller 240, and the negative output 244 of the controller 240 is electrically connected to the negative terminal 222 of the battery 210. In this example, the negative output 244 of the controller 240 is connected to the negative terminal 222 of the battery 210 via conductive strip 245 and conductive side wall 214, which is in electrical contact with negative terminal 222 of the conductive bottom cap 218 of the battery 210. In this case, the conductive side wall must be electrically insulated from the top cap 216. The positive input 246 of the controller 240 is electrically connected to the cathode 232 of the electrochemical cell 230 via current collector 226. The negative input 248 of controller 240 is electrically connected to the anode 234 of the electrochemical cell 230 via conductive strip 237. Alternatively, the controller 240 may be placed between the bottom cap 218 and the insulator 225, or attached, affixed or joined to the outside of the container or the label of the battery.

In FIG. 5B, the controller 340 is placed between the bottom cap 318 and the insulator 325 of the battery 310. The negative output 344 of the controller 340 is electrically connected to the negative terminal 322 of the battery 310, which is directly adjacent to the controller 340, and the positive output 342 of the controller 340 is electrically connected to the positive terminal 320 of the battery 310. In this example, the positive output 342 of the controller 340 is connected to the positive terminal 320 of the battery 310 via conductive strip 349 and conductive side wall 314, which is in electrical contact with positive terminal 320 of the conductive top cap 316 of the battery 310. The positive input 346 of the controller 340 is electrically connected to the cathode 332 of the electrochemical cell 330 via conductive strip 336. The negative input 348 of controller 340 is electrically connected to the anode 334 of the electrochemical cell 330 via current collector 326, which extends from bottom plate 319 into the anode 334 of the electrochemical cell 330. In such cases, the current collector 326 and the negative input 348 of the controller 340 must be insulated from the negative terminal 322 of the container 312 and the negative output 344 of the controller 340 if the controller 340 uses a virtual ground. Alternatively, the controller 340 may be placed between the top cap 316 and the insulator 324, or attached, affixed or joined to the outside of the container 312 or the label of the battery.

In FIG. 5C, the controller 440 is formed on a wrapper 441 using thick film printing technology, or flexible printed circuit boards ("PCBs"), and placed inside the container between the side wall 414 and the cathode 432 of the battery 410. The positive output 442 of the controller 440 is electrically connected to the positive terminal 420 of the battery 410 via top cap 416 of the battery 410, and the negative output 444 of the controller 440 is electrically connected to the negative terminal 422 of the battery 410 via bottom plate 419 and bottom cap 418. The positive input 446 of the controller 440 is electrically connected to the cathode 432 of the electrochemical cell 430, which in this example is directly adjacent to the wrapper 441 containing the controller 440. The negative input 448 of controller 440 is electrically connected to the anode 434 of the electrochemical cell 430 via contact plate 431 and the current collector 426, which extends from contact plate 431 into the anode 434 of the electrochemical cell 430. Insulating washer 427 isolates the contact plate 431 from the cathode 432. As shown in FIG. 5C, the insulating washer may also extend between the anode 434 and contact plate 431 because current collector 426 provides the connection from the anode 434 to the contact plate 431. If the controller 440 uses a virtual ground, the contact plate 431 must also be insulated from the bottom plate 419 and the negative terminal 422 such as by insulating washer 425. Alternatively, the wrapper 441 may also be disposed on the outside of the container 412, wrapped around the outside of the side wall 414. In such embodiments, the label may cover the wrapper, or the label may be printed on the same wrapper as the controller itself FIG. 6 shows a perspective view, partially in section, of a multi-cell 9 volt battery 610 of the present invention in which each electrochemical cell 630 has a controller 640 inside the cell's individual container 612. In this embodiment, the battery 610 contains six individual electrochemical cells 630, each having a nominal voltage of approximately 1.5 volts. The battery 610, for example, could also contain three lithium cells, each having a nominal voltage of approximately 3 volts apiece.

Figure 4:
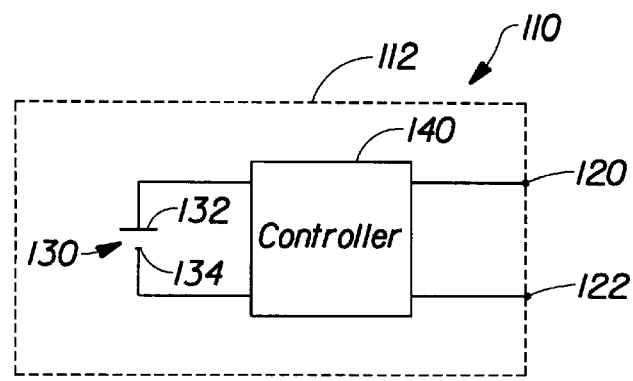
FIG. 4 is a block diagram of a battery of the present invention.
Figure 4A:
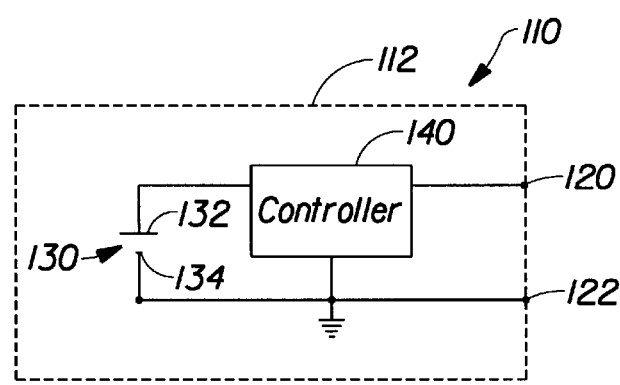
FIG. 4A is a block diagram of one preferred embodiment of the battery shown in FIG. 4.
Figure 4B:
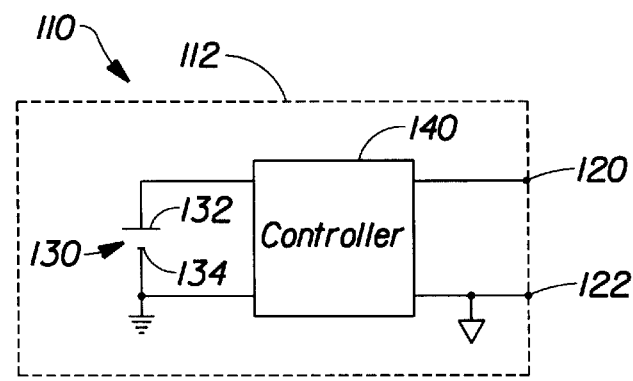
FIG. 4B is a block diagram of another preferred embodiment of the battery shown in FIG. 4.

FIGS. 4, 4A and 4B show block diagrams of different embodiments of the battery 110 of the present invention. FIG. 4 shows a block diagram of one embodiment of a battery of the present invention utilizing an embedded integrated controller circuit 140. This embodiment preferably utilizes a mixed-mode integrated circuit that has both digital and analog components. The controller circuit could alternatively be fabricated using an application specific integrated circuit ("ASIC"), a hybrid chip design, a PC board or any other form of circuit fabrication technology known in the art. The controller circuit 140 may be placed inside the battery container 112 between the positive 132 and negative 134 electrodes of the electrochemical cell 130 and the positive 120 and negative 122 terminals of the battery. Thus, the controller 140 can connect the electrochemical cell 130 to or disconnect the electrochemical cell 130 from the terminals 120 and 122 of the container 112, alter or stabilize the output voltage or the output impedance of the cell 130 that is applied to the battery terminals 120 and 122. FIG. 4A shows one preferred embodiment of the battery 110 of the present invention shown in FIG. 4. In FIG. 4A, the controller 140 is connected between the positive electrode (cathode) 132 of the electrochemical cell 130 and the positive terminal 120 of the battery container 112. The negative electrode (anode) 134 of the electrochemical cell 130 and the negative terminal 122 of the battery container 112 share a common ground with the controller 140. FIG. 4B, however, shows an alternative preferred embodiment of the battery 110 of the present invention in which the controller 140 operates on a virtual ground and isolates the negative electrode 134 of the electrochemical cell 130 from the negative terminal 122 of the container 112 in addition to isolating the positive electrode 132 of the electrochemical cell 130 from the positive terminal 120 of the container 112.

Each of the embodiments shown in FIGS. 4A and 4B has its own advantages and disadvantages. The configuration of FIG. 4A, for example, allows for a simpler circuit design having a common ground for the electrochemical cell 130, the controller 140 and the negative terminal 122 of the battery container 112. The configuration of FIG. 4A, however, has the disadvantage of requiring a converter to work under true electrochemical cell voltage levels and may require the use of a discrete inductor element. In the configuration of FIG. 4B, the virtual ground applied to the negative terminal 122 of the battery container 112 both isolates the negative electrode 134 of the electrochemical cell 130 from the load and allows the use of an almost inductorless DC/DC converter. This configuration, however, has the disadvantage of requiring the increased circuit complexity of a virtual ground in order to allow a voltage of the controller 140 to continue to operate more efficiently when the cell voltage is below the nominal voltage level of the electrochemical cell.

A primary battery of the present invention includes a controller for extending the service run time of the battery. Electrochemical cell(s) may be packaged in either single-cell or multiple-cell batteries. Multiple-cell batteries may include two or more of the same type of electrochemical cell, or include two or more different types of electrochemical cells in a hybrid battery. The multiple-cell battery of the present invention may contain electrochemical cells electrically arranged in series and/or in parallel. The controller(s) of a single-cell battery may be electrically connected in series and/or parallel with the electrochemical cell(s) inside a container of a cell, and packaged inside a housing that at least partially contains the container of the cell, or attached to the container, the housing, or to a label or any other structure affixed to the container or housing. The controller(s) of a multiple-cell battery may be packaged along with one or more of the individual cells as described with respect to a single-cell battery, and/or may be packaged along with a combination of multiple cells such that the controller is connected in series or in parallel with the combination of electrochemical cells.

The controller may extend the service run time of a disposable battery of the present invention in one of several ways. First, the controller may allow one or more of the electrochemical cell(s) of the battery to be more deeply discharged by an electronic device than would be otherwise possible. In this application, the term "deep discharge" refers to allowing the electrochemical cell(s) to be discharged to at least 80% of the rated capacity of the electrochemical cell(s). In addition, the term "substantial discharge" in this application refers to allowing the electrochemical cell(s) to be discharged to at least 70% of the rated capacity of the electrochemical cell(s). "Overdischarge" is referred to in this application as discharging the electrochemical cell beyond 100%, which may lead to a voltage reversal. A typical alkaline battery on the market today, for example, is generally capable of delivering approximately 40 to 70% of its stored energy capacity before the voltage level of the electrochemical cell drops to a voltage level that is insufficient to drive a typical electronic device. Thus, a controller of the present invention preferably provides an alkaline cell that is capable of greater than about 70% discharge before the battery cuts off. More preferably, the controller provides a discharge level of greater than about 80%. Even more preferably, the controller provides a discharge level of greater than about 90%, with greater than about 95% being the most preferred.

The controller may include a converter that converts the cell voltages to a desired output voltage for a battery in order to allow a deeper discharge of the electrochemical cell(s) and thereby extend the service run time of the battery. In one embodiment of the present invention, the controller may continuously convert the cell voltage to a desired output voltage over the service run time of the battery. When the cell voltage drops to the level of the device cut-off voltage where the battery discharge would normally cut-off, the controller is boosting, or stepping up, the cell voltage to a level at the output of the battery that is sufficient to continue to drive the electronic device until the voltage level drops below the minimum required voltage to drive the controller. Thus, a battery having a controller design that is capable of operating at a lower voltage level than the controller of another battery will provide a battery capable of being more deeply discharged.

In preferred embodiments of the present invention, the converter operates only when the cell voltage falls to or below a predetermined voltage level. In such embodiments, the internal losses of the converter are minimized because the converter operates only when necessary. The predetermined voltage level is preferably in the range from the nominal voltage of the electrochemical cell to the highest cut-off voltage of the class of devices for which the battery is intended to operate. More preferably, the predetermined voltage level is slightly greater than the highest cut-off voltage of the class of devices for which the battery is intended to operate. For example, the predetermined voltage level may be in the range from about the highest cut-off voltage of the class of devices for which the battery is intended to operate to about 0.2 volts plus that cut-off voltage, preferably in the range from about the highest cut-off voltage of the class of devices for which the battery is intended to operate to about 0.15 volts plus that cut-off voltage, more preferably in the range from about the highest cut-off voltage of the class of devices for which the battery is intended to operate to about 0.1 volts plus that cut-off voltage, and even more preferably in the range from about the highest cut-off voltage of the class of devices for which the battery is intended to operate to about 0.05 volts plus that cut-off voltage. An electrochemical cell having a nominal voltage of about 1.5 volts, for example, generally has a predetermined voltage is in the range between about 0.8 volts and about 1.8 volts. Preferably, the predetermined voltage in the range between about 0.9 volts and about 1.6 volts. More preferably, the predetermined voltage is in the range between about 0.9 volts and about 1.5 volts. Even more preferably, the predetermined voltage is in the range between about 0.9 volts and about 1.2 volts, with the range between about 1.0 volts and about 1.2 volts being yet even more preferred. The voltage level of slightly greater than or equal to the highest cut-off voltage of the class of devices for which the battery is intended to operate being the most preferred. A controller designed for operation with an electrochemical cell having a nominal voltage of about 3.0 volts, however, generally may have a predetermined voltage level is in the range from about 2.0 volts to about 3.4 volts. Preferably, the predetermined voltage is in the range from about 2.2 volts to about 3.2 volts. More preferably, the predetermined voltage is in the range from about 2.4 volts to about 3.2 volts. Even more preferably, the predetermined voltage is in the range from about 2.6 volts to about 3.2 volts, with the range from about 2.8 volts to about 3.0 volts being yet even more preferred. The voltage level of slightly greater than or equal to the highest cut-off voltage of the class of devices for which the battery is intended to operate being the most preferred.

When the cell voltage falls to or below the predetermined voltage level, the controller turns on the converter and boosts the cell voltage to a desired output voltage sufficient to drive the load. This eliminates internal losses of the converter that are not necessary when the cell voltage is high enough to drive the load, but then allows the electrochemical cell to continue to discharge even after the cell voltage drops to a level below that which is required to drive the load. The controller may use any one or more of a number of control mechanisms from a simple voltage comparator and electronic switch combination that turns on the converter when the cell voltage drops to the predetermined voltage level, to more complex control schemes such as the ones described below.

A universal battery of the present invention that is designed for a given output voltage is preferably able to extend the service run time of the battery when it is used to power a device. As used in this application, a "universal" battery is a battery that can provide a uniform output voltage independent of the cell electrochemistry. Thus, the battery of the present invention is preferably designed to extend the service run time by maintaining the output voltage of the battery at a level greater than or equal to the highest cut-off voltage of the electronic devices in that class until the built-in controller shuts down when the voltage of the electrochemical cell(s) drops to a level below which the controller can no longer operate. A battery of the present invention that is designed to power a specific electronic device or a narrow class or electronic devices that have similar cut-off voltages may be specifically designed to operate more efficiently by matching the predetermined voltage level to the cut-off voltage(s) of those device(s) more closely.

Second, the controller may also step down the cell voltage of electrochemical cell(s) having a nominal voltage greater than the desired output voltage and/or alter the output impedance of the electrochemical cell(s) of a battery. This not only extends the service run time of the batteries, but also allows for greater interchangeability between electrochemical cells having different nominal voltages than is otherwise possible, allows designers to take advantage of the greater storage potential of electrochemical cells having a higher nominal voltage, and allows designers to alter the output impedance of a certain electrochemical cell in order to match the impedance to a desired level either to increase the interchangeability of the electrochemical cell with other types of electrochemical cells, and/or to increase the efficiency of the electrochemical cell with a particular type of load. In addition, electrochemical cells that are inefficient, hazardous to the environment, expensive, etc. and are used generally only because a particular nominal voltage is required, such as a mercury cadmium cell, may be replaced by safer, more efficient or cheaper electrochemical cells having their nominal voltage stepped up or stepped down or their output impedance altered in order to meet the required nominal voltage or output impedance required by the application.

An electrochemical cell having a nominal voltage of about 1.8 volts or higher, for example, can be packaged with a controller that steps down this higher nominal voltage to the standard nominal level of about 1.5 volts so that the battery may be used interchangeably with a battery having a nominal voltage of about 1.5 volts. In one specific example, a standard lithium cell such as a lithium $MnO_2$ cell having a nominal voltage of approximately 3.0 volts may be packaged with a step down controller so that the battery having the cell and the controller has a nominal voltage of approximately 1.5 volts. This provides a battery having at least two times more capacity than a battery having an electrochemical cell with a nominal voltage of about 1.5 volts and the same volume. In addition, it also provides a lithium cell that is truly interchangeable with a standard alkaline or zinc-carbon single-cell battery, without the need to chemically alter the lithium cell chemistry, which decreases the chemical energy storage of the cell. Additionally, batteries having electrochemical cells such as magnesium, magnesium air, and aluminum air also have nominal voltages above about 1.8 volts and can be used interchangeably with a standard battery having a nominal voltage of about 1.5 volts. Not only can different types of electrochemical cells be used interchangeably, but different types of electrochemical cells can be packaged together in a hybrid battery. Thus, different types of batteries having different electrochemical cells with various nominal voltages or internal impedance may be used interchangeably, or hybrid batteries may be manufactured having different types of electrochemical cells.

Alternatively, electrochemical cells that have nominal voltages below that which a given electronic device will operate may be used with a controller having a built-in step-up converter to boost the nominal voltage. This allows a battery having this type of electrochemical cell to be used with a device that requires a higher voltage level than the cell would otherwise provide. In addition, the battery having this type of cell may also be used interchangeably with a standard alkaline or a zinc-carbon electrochemical cell. This may provide commercially-feasible, usable batteries having electrochemical cells that have not otherwise been considered for consumer disposable use because the nominal voltages were too low to be practical.

Zinc-carbon, alkaline and lithium batteries are discussed as examples of battery types that may be used in the present invention. Other types of batteries such as, but not limited to, the primary batteries shown in Table 1 may also be used in a primary battery of the present invention. The secondary electrochemical cells may also be used in combination with a primary electrochemical cell in a hybrid battery. Indeed, the present invention allows greater interchangeability between various types of electrochemical cells, and between electrochemical cells and alternative power supplies such as fuel cells, capacitors, etc. than ever before. By placing a controller in each electrochemical cell, the electrical characteristics such as the nominal voltage and the output impedance of different types of electrochemical cells can be adjusted in order to allow a larger variety of cells to be used in making interchangeable standard size batteries. Batteries may be specifically designed to take advantage of particular advantages of an electrochemical cell, while still permitting interchangeability with batteries that use other types of cells. Further, the present invention may be used to create new standard voltage levels by converting the nominal voltages of electrochemical cells to the voltage levels of the standards.

TABLE 1

Electrochemical Cell Types and Nominal Voltages

| Type of Cell | Nominal Voltage |
|---|---|
| Primary Cells | |
| Mercad | 0.9 volts |
| Mercuric Oxide | 1.35 volts |
| Mercuric Oxide with $MnO_2$ | 1.4 volts |
| Zinc-Air | 1.4 volts |
| Carbon-Zinc | 1.5 volts |
| Zinc-Chloride | 1.5 volts |
| Alkaline $MnO_2$ | 1.5 volts |
| Silver-Oxide | 1.5 volts |
| Lithium $FeS_2$ | 1.6 volts |
| Magnesium-Organic electrolyte | 1.6 volts |
| Magnesium $MnO_2$ | 2.8 volts |
| Lithium-Solid Electrolyte | 2.8 volts |
| Lithium $MnO_2$ | 3.0 volts |
| Lithium $(CF)_n$ | 3.0 volts |
| Lithium $SO_2$ | 3.0 volts |
| Lithium $SOCl_2$ | 3.6 volts |
| Secondary Cells | |
| Silver-cadmium | 1.1 volts |
| Edison (Fe-Ni oxide) | 1.2 volts |
| Nickel-cadmium | 1.2 volts |
| Nickel Metal Hydride | 1.2 volts |
| Nickel Hydrogen | 1.2 volts |
| Silver-zinc | 1.5 volts |
| Zinc-air | 1.5 volts |
| Nickel-zinc | 1.6 volts |
| Zinc-bromine | 1.6 volts |
| High Temperature Li(Al)-$FeS_2$ | 1.7 volts |
| Aluminum-air | 1.9 volts |
| Lead-acid | 2.0 volts |
| High Temperature Na-S | 2.0 volts |
| Lithium-organic Li-$MnO_2$ | 3.0 volts |
| Lithium-polymer Li-$V_6O_{13}$ | 3.0 volts |
| Lithium-ion C-$Li_xCoO_2$ | 4.0 volts |

In addition, otherwise incompatible electrochemical cells may be used together in hybrid batteries specially designed for particular types of applications. For example, a zinc-air electrochemical cell may be used together either in parallel or in series with a lithium cell in a hybrid battery. The zinc-air cell has a nominal voltage of about 1.5 volts and a very high energy density, but can only provide low, steady current levels. The lithium cell, however, has a nominal voltage level of about 3.0 volts and can provide short bursts of high current levels. The controllers of each electrochemical cell provide the same nominal output voltage and allow for an arrangement either in a parallel or series electrical configuration. When the cells are in a parallel configuration, the controllers also prevent the cells from charging one another. The controller for each cell can be used to connect or disconnect either or both of the cells as needed by the load. Thus, when the load is in a low power mode, the zinc-air cell can be connected to provide a steady, low current, and, when the load is in a high power mode, the lithium cell or the lithium and the zinc-air cells in combination can provide the current necessary to power the load.

Hybrid batteries may also contain many different varieties of electrochemical cells such as alkaline and metal-air, metal-air and a secondary cell, metal-air and a super capacitor. Further, a hybrid battery may also contain combinations of primary and secondary cells, primary and reserve cells, secondary and reserve cells, or a primary, secondary and reserve cells. A hybrid battery may also contain a combination of one or more electrochemical cell and one or more alternative power supplies such as a fuel cell, a conventional capacitor or even a super-capacitor. Moreover, hybrid batteries may also contain any combination of two or more of the above mentioned cells or power supplies.

Further, the controller may also extend the run time of the battery by protecting the electrochemical cell(s) from current peaks that can impair the operation of the electrochemical cell components and lower the cell voltage. For example, the controller may prevent high current demands from creating a memory effect in the cell and decreasing the run time of the battery. The current peaks are also harmful to electrochemical cells such as alkaline, lithium and zinc-air cells.

A controller that protects the electrochemical cell from current peaks may provide a temporary storage of electrical charge at the output of the controller so that this temporary storage may be utilized upon immediate demand. Therefore, a current peak demand may be completely eliminated or significantly reduced before it reaches the electrochemical cell. This allows a battery to provide current peaks higher than the electrochemical cell(s) can provide directly and protects the electrochemical cell(s) from current peaks that may be detrimental to the cell components. The temporary storage element is preferably a capacitor. This capacitor may be any type of capacitor that is known in the art such as a conventional capacitor, a thick-film printed capacitor or even a "super-capacitor." FIG. 13, for example, shows capacitor $C_f$ connected across the output terminals 1320 and 1322 of the container 1312.

A single controller will preferably extend the service run time of the battery by both protecting the cell against current peaks and by converting the cell voltage to a desired output voltage. For example, a preferred embodiment of the controller can turn a converter on when the cell voltage drops to a predetermined voltage in order to minimize losses associated with the converter. The same controller may monitor both the cell voltage and the output load current and turn on the converter if either the cell voltage reaches the predetermined voltage level or the load current reaches a predetermined current level. Alternatively, the controller may monitor both the cell voltage and the output load current and determine if supplying the required load current will drop the cell voltage below a cut-off voltage level. In the latter example, the controller is operating upon two input signals combined in an algorithm to determine if the converter should be turned on. In the former example, however, the controller turns on the converter if either the cell voltage drops to a predetermined voltage level, or the output load current rises to a predetermined current level. These, along with other possible control schemes, are discussed in more detail below.

The present invention relates to specialized primary batteries as well as standard consumer primary batteries, such as AAA, AA, C or D single-cell batteries and 9 volt multiple-cell batteries. The invention contemplates the use of specialized primary batteries and hybrid batteries that could be used in various applications. It is anticipated that these specialized primary batteries and hybrid batteries could be used to replace rechargeable batteries for uses such as for cellular telephones, laptop computers, etc., which are currently limited by the ability of primary batteries to provide the required current rate over a sufficient period of time. In addition, being able to individually control the output voltage and output impedance of the cells will allow battery designers to design entirely new types of hybrid batteries that use different types of cells in combination or alternative power supplies, such as fuel cells, conventional capacitors or even "super-capacitors," in the same hybrid battery. The increase of interchangeable types of electrochemical cells allows battery designers to provide standard batteries to decrease the reliance upon batteries custom designed for particular devices such as cellular telephones, laptop computers, camcorders, cameras, etc. A consumer could simply purchase standard batteries to power a cellular telephone, much like a consumer would presently purchase for a flashlight or tape recorder, instead of having to purchase a battery specifically manufactured for the particular type, brand and/or model electronic device. In addition, as the number of standard batteries manufactured increased, the cost per unit would rapidly decrease, resulting in much more affordable batteries that could ultimately replace specially designed rechargeable batteries.

Electronic labeling technology such as that used on photographic film, etc. could also be used to designate the exact type of cell(s) in the battery, rated and/or remaining capacity of the cell(s), peak and optimal current delivery capabilities, current charge level, internal impedance, etc. so that a "smart" device could read the electronic labeling and optimize its consumption to enhance the performance of the device, to extend the service run time of the battery, etc. A camera, which already utilizes electronic labeling to determine film speed, etc., for example, could also utilize electronic labeling technology with its batteries to allow for a slower charge time of the flash, stop use of the flash, etc. in order to optimize the service run time of a particular battery. A laptop could also utilize electronic labeling technology to determine the most efficient operating parameters for particular batteries by, for example, changing its operating speed in order to best use the remaining charge in the battery for a duration desired by a user, or utilizing power on/power off technology to conserve energy of the battery. In addition, camcorders, cellular telephones, etc. could also utilize electronic labeling to optimize the usage of batteries.

Further, primary batteries could also be used interchangeably with different types of primary or even rechargeable batteries depending upon the needs of the consumer. For example, if the rechargeable battery of a laptop computer was exhausted, the user could purchase primary batteries that would last for several hours of use until the user could charge the rechargeable battery. A user, for example, could also purchase less expensive batteries if the user did not need certain higher-performance levels that could be provided by the device with more expensive batteries.

The present invention also relates to standard consumer primary batteries, such as AAA, AA, C or D single-cell batteries and 9 volt multiple-cell batteries. In a preferred embodiment, for example, the controller can be designed to operate with a battery that has a nominal voltage of about 1.5 volts so that the controller can operate at voltage levels as low as about 0.1 volts in an silicon carbide ("SiC") embodiment, about 0.34 volts in a gallium arsenide ("GaAs") embodiment, and about 0.54 volts in a conventional silicon-based embodiment. In addition, as printing size decreases, these minimum operating voltages will decrease as well. In silicon, for example, decreasing the circuit printing to 0.18 micron technology would decrease the minimum operating voltage from about 0.54 volts to about 0.4 volts. As described above, the lower the minimum required operating voltage of the controller, the lower that controller can regulate the cell voltage in order to provide the deepest discharge of the electrochemical cell possible. Thus, it is within the comprehension of this invention to utilize different advances of in circuit fabrication to increase the battery utilization up to approximately 100% of the stored charge of the electrochemical cell. The present silicon-based embodiment, however, provides up to a 95% usage of the battery storage potential, which is quite high in comparison to the average 40–70% usage without a controller.

In one silicon-based preferred embodiment, for example, the controller is designed to operate at voltages as low as about 1 volt, more preferably about 0.85 volts, even more preferably about 0.8 volts, yet even more preferably about 0.75 volts, even more preferably about 0.7 volts, yet even more preferably about 0.65 volts, even more preferably about 0.6 volts, with about 0.54 volts being the most preferred. In a controller designed for an electrochemical cell having a nominal voltage of about 1.5 volts, the controller is preferably capable of operating at an input voltage at least as high as about 1.6 volts. More preferably, the controller is capable of operating at an input voltage of at least as high as about 1.8 volts. Thus, a preferred controller should be able to operate in a voltage range from a minimum of about 0.8 volts to at least 1.6 volts. The controller may, and preferably does, however, operate outside of that range as well.

In a preferred embodiment of a controller of the present invention designed for use with an electrochemical cell having a nominal voltage of about 3.0 volts, however, the controller must be able to operate at a higher voltage level than is required for a controller used in conjunction with an electrochemical cell having a nominal voltage of about 1.5 volts. In the case of an electrochemical cell having a nominal voltage of about 3.0 volts, the controller is preferably able to operate in the range from about 2.4 volts to about 3.2 volts. The controller more preferably is capable of operating in a voltage range from about 0.8 volts to at least about 3.2 volts. More preferably, the controller is capable of operating with an input voltage in the range from about 0.6 volts to at least about 3.4 volts. Even more preferably, the controller is capable of operating with an input voltage in the range from about 0.54 volts to at least about 3.6 volts, with the range from about 0.45 volts to at least about 3.8 volts being the most preferred. The controller may, and preferably does, however, operate outside of that range as well.

An alternative preferred embodiment is capable of operation with an electrochemical cell having a nominal voltage of either about 1.5 volts or about 3.0 volts. In this embodiment the controller is capable of operating with a minimum input voltage of about 0.8 volts, preferably about 0.7 volts, more preferably about 0.6 volts and most preferably about 0.54 volts, and a maximum input voltage of at least about 3.2 volts, preferably about 3.4 volts, more preferably about 3.6 volts and most preferably about 3.8 volts. For example, the controller may be capable of operating in the range from about 0.54 volts to about 3.4 volts, or from about 0.54 volts to about 3.8 volts, or from about 0.7 volts to about 3.8 volts, etc.

The batteries of the present invention also provide distinct advantages over typical batteries when used with electric devices such as flashlights, etc. that do not have a cut-off voltage. With a typical battery, as the battery is discharged the output voltage of the battery decreases. Because the output power of the electric device is directly proportional to the voltage supplied by the battery, the output of the electric device decreases proportionately with the battery output voltage. For example, the intensity of a flashlight light bulb will continue to dim as the output voltage of the battery decreases until the battery is fully discharged. The battery of the present invention, however, has a controller that regulates the cell voltage into a relatively constant, controlled voltage level over the entire discharge cycle of the battery until the cell voltage decreases to a level below which the controller is capable of operating. At that time, the battery will shut down, and the electric device will stop operating. During the discharge cycle, however, the electric device will continue to provide a relatively steady output (e.g., bulb intensity) until the battery shuts down.

A preferred embodiment of a battery of the present invention also includes a low remaining charge capacity warning to the user. The controller, for example, may disconnect and reconnect the electrochemical cell(s) from the output terminals of the battery intermittently for a short duration of time when the electrochemical cell voltage reaches a predetermined value. This may provide a visible, audible, or device readable indication that the battery is about to shut down. Additionally, the controller could also artificially recreate conditions of an accelerated battery discharge condition by decreasing the output voltage of the battery at the end of the battery run time. For example, the controller could begin ramping down the output voltage when the battery storage capacity is at about 5% of its rated capacity. This could provide an indication to the user such as a decreasing volume in a tape or compact disc player, or provide an indication to the device, which could warn the user accordingly.

Figure 7:
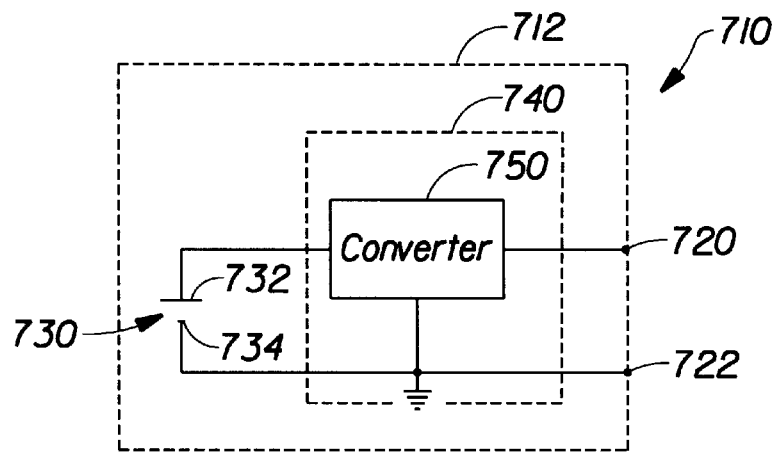
FIG. 7 is a block diagram of another preferred embodiment of a battery of the present invention.

FIG. 7 shows a block diagram of one embodiment of the present invention in which the DC/DC converter 750 is electrically, or preferably electronically, connected between the positive 732 and negative 734 electrodes of the electrochemical cell 730 and the positive 720 and negative 722 terminals of the container 712. The DC/DC converter 750 converts the cell voltage across the positive 732 and the negative 734 electrodes of the electrochemical cell 730 to the output voltage at the positive 720 and the negative 722 terminals of the container 712. The DC/DC converter 750 may provide for step up conversion, step down conversion, both step up and step down conversion, or voltage stabilization at the output terminals 720 and 722. In this embodiment, the DC/DC converter 750 operates in a continuous mode in which the output voltage of the electrochemical cell 730 will be converted into a stable output voltage at the terminals 720 and 722 of the container over the service run time of the battery. This embodiment stabilizes the output voltage of the container 712 at the output terminals 720 and 722. Providing a stable output voltage allows electronic device designers to decrease complexity of the power management circuits of the electronic devices, and, correspondingly, to decrease the size, weight and cost of the devices as well.

The DC/DC converter 750 will continue to operate until the cell voltage of the electrochemical cell 730 drops below the minimum forward-bias voltage of the electronic components, Vfb, of the converter 750. To the extent that the minimum switching voltage, Vfb, of the DC/DC converter 750 is lower than the cut-off voltage of the electronic device that the battery 710 is powering, the controller 740 will also extend the service run time of the battery 710 beyond the cut-off voltage of the electronic device as long as the stabilized output voltage at the terminals 720 and 722 of the container 712 is above the cut-off voltage of the electronic device.

In one preferred embodiment of the present invention as shown in FIG. 7, the DC/DC converter 750 that operates in a continuous mode may be a step down converter that lowers the cell voltage of the electrochemical cell 730 to an output voltage of the container 712. In one embodiment of a controller 740 that includes a step down converter, the converter lowers the voltage of a first type of electrochemical cell 730 to an output voltage of the container 712 that is about the nominal voltage level of a second type of electrochemical cell so that the battery containing the first type of electrochemical cell 730 is interchangeable with a battery containing the second type of electrochemical cell. For example, an electrochemical cell having a higher nominal voltage than a standard 1.5 volt cell could be used in combination with a step down converter that operates continuously to provide a cell that is interchangeable with the standard cell without the need to chemically alter the electrochemical cell. This embodiment allows for a greater degree of interchangeability between different types of electrochemical cells than is otherwise possible without chemically altering the structure of the electrochemical cell itself and diminishing the chemical energy storage of the cell.

A lithium cell, for example, may be used in a standard AA battery package to provide at least two times more capacity than an alkaline battery of the same volume. A lithium cell such as a lithium $MnO_2$ has a nominal voltage of about 3.0 volts and cannot normally be used interchangeably with a AA alkaline battery that has a 1.5 volt nominal voltage. Battery designers have, however, altered the lithium electrochemical cell chemistry to create lithium batteries that have a nominal voltage of about 1.5 volts in order to create a lithium battery that may be used interchangeably with a standard AA alkaline battery, for example. Although this 1.5 volt lithium battery still has the capability of delivering high current levels to photographic flash load circuits, the 1.5 volt lithium electrochemical cell does not provide a substantial increase in the total chemical energy storage over an alkaline cell of the same volume. The present invention, however, provides the ability to use a standard lithium electrochemical cell that has a nominal voltage of about 3 volts and a controller to convert that nominal voltage down to about 1.5 volts. Thus, the battery provides roughly twice the chemical energy storage of a battery containing either the chemically-altered 1.5 volt lithium cell or a 1.5 volt alkaline cell in a battery that is completely interchangeable with either 1.5 volt battery. Additionally, the lithium battery of the present invention would provide the same high current levels as a battery containing a 1.5 volt chemically altered lithium cell.

Additionally, the controller 740 also optimizes the performance of an electric device such as a flashlight that uses battery 710. Although an electric device will not shut off like an electronic device at a minimum operating voltage, the performance of the electric device, such as the intensity of the flashlight bulb, will decrease as the input voltage decreases. Thus, a stable battery 710 output voltage allows the electric device performance to remain constant over the service run time of the battery without the device performance decreasing as the voltage of the electrochemical cell 730 decreases.

The DC/DC converter 750 may utilize one or more of many known control schemes such as pulse modulation, which can further include pulse-width modulation ("PWM"), pulse-amplitude modulation ("PAM"), pulse-frequency modulation ("PFM") and pulse-phase modulation ("PψM") resonant converters etc. to control the operating parameters of the converter 750. A preferred embodiment of the converter 750 of the present invention utilizes pulse-width modulation. An even more preferred embodiment utilizes a combination of pulse-width modulation and pulse-phase modulation, which is described in detail below.

In a preferred embodiment DC/DC converter 750 for use in a battery of the present invention, the converter is controlled by a pulse-width modulator to drive the DC/DC converter 750. The pulse-width modulator generates a fixed frequency control signal in which the duty cycle is varied.

For example, the duty cycle may be zero when the DC/DC converter is off, 100% when the converter is operating at full capacity, and varied between zero and 100% depending upon the demand of the load and/or the remaining capacity of the electrochemical cell 730. The pulse-width modulation scheme has at least one input signal that is used to generate the duty cycle. In one embodiment, the output voltage at the terminals 720 and 722 of the container 712 is continuously sampled and compared to a reference voltage. The error correction signal is used to alter the duty cycle of the DC/DC converter. In this instance, the negative feedback loop from the output voltage at the terminals 720 and 722 of the container 712 allows the DC/DC converter 750 to provide a stabilized output voltage. Alternatively, the DC/DC converter 750 can utilize multiple input signals such as the cell voltage, i.e., the voltage across the positive 732 and the negative 734 electrodes of the electrochemical cell 730, and the output current to generate the duty cycle. In this embodiment, the cell voltage and the output current are monitored, and the DC/DC converter 750 generates a duty cycle that is a function of those two parameters.

FIGS. 8–11 show block diagrams of additional embodiments of integrated controller circuits of the present invention. In each of these embodiments, the integrated controller circuit includes at least two main components: (1) a DC/DC converter; and (2) a converter controller that electrically, or preferably electronically, connects and disconnects the DC/DC converter between the electrodes of the electrochemical cell and the output terminals of the container so that the internal losses of the DC/DC converter are incurred only when the DC/DC converter is necessary to convert the cell voltage to a voltage necessary to drive the load. The DC/DC converter, for example, may be turned on only when the cell voltage falls to a predetermined level below which the load can no longer operate. Alternatively, if the electronic device requires an input voltage within a specific range such as ±10% of the nominal voltage of the battery, for example, the converter controller may turn "on" the DC/DC converter when the cell voltage is outside the desired range, but turn the converter "off" when the cell voltage is within the desired range.

Figure 8:
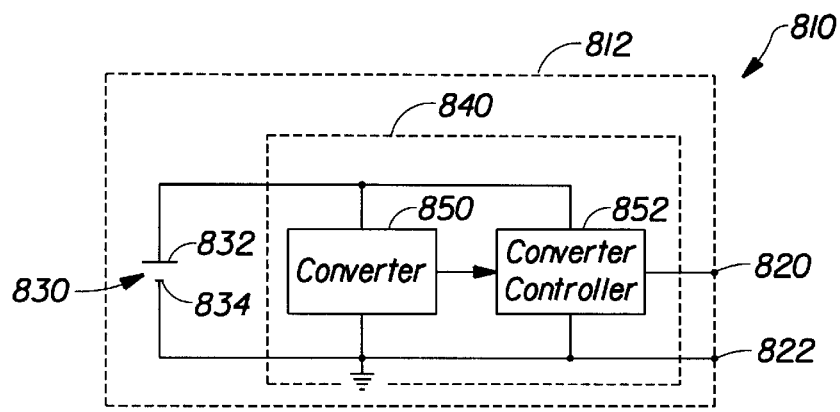
FIG. 8 is a block diagram of yet another preferred embodiment of a battery of the present invention.

In FIG. 8, for example, the DC/DC converter 850 is electrically connected between the positive 832 and the negative 834 electrodes of the electrochemical cell 830 and the positive 820 and the negative 822 terminals of the container 812. The converter controller 852 is also electrically connected between the positive 832 and negative 834 electrodes electrochemical cell 830 and the positive 820 and negative 822 terminals of the container 812. In this example, the converter controller 852 acts as a switch that either connects the electrochemical cell 830 directly to the output terminals 820 and 822 of the container 812, or connects the DC/DC converter 850 between the electrochemical cell 830 and the output terminals 820 and 822 of the container 812. The converter controller 852 continuously samples the output voltage and compares it to one or more internally generated threshold voltages. If the output voltage of the container 812 falls below the threshold voltage level or is outside a desired range of threshold voltages, for example, the converter controller 852 "turns on" the DC/DC converter 850 by electrically, or preferably electronically, connecting the DC/DC converter 850 between the electrochemical cell 830 and the output terminals 820 and 822 of the container 812. The threshold voltage is preferably in the range from about between the nominal voltage of the electrochemical cell 830 to about the highest cut-off and the voltage of the class of electronic devices with which the battery is designed to operate. Alternatively, the converter controller 852 may continuously sample the cell voltage of the electrochemical cell 830 and compare that voltage to the threshold voltage in order to control the operation of the DC/DC converter 850.

Figure 9:
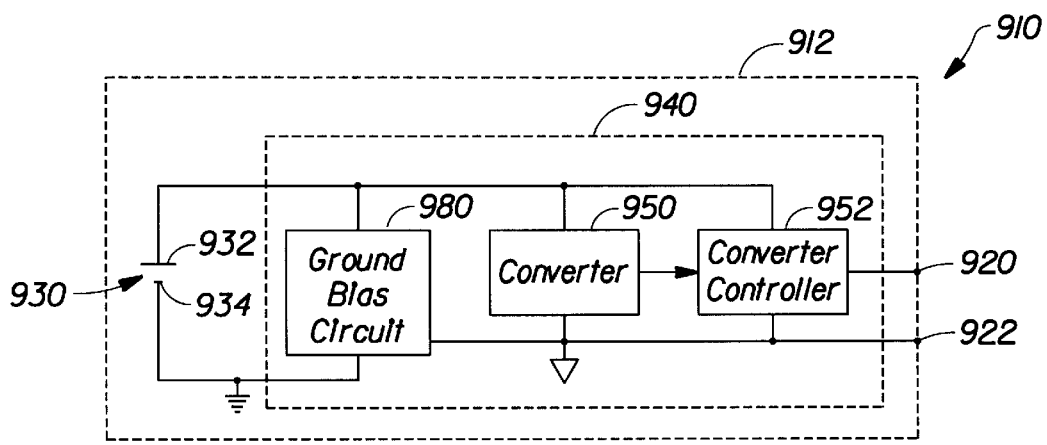
FIG. 9 is a block diagram of another preferred embodiment of a battery of the present invention.

The controller 940 of FIG. 9 may include the elements of the controller 840 shown in FIG. 8, but further includes a ground bias circuit 980 electrically connected between the electrodes 932 and 934 of the electrochemical cell 930, and the DC/DC converter 950, the converter controller 952, and the output terminals 920 and 922 of the container 912. The ground bias circuit 980 provides a negatively biased voltage level, Vnb, to the DC/DC converter 950 and to the negative output terminal 922 of the container 912. This increases the voltage applied to the DC/DC converter 950 from the cell voltage to a voltage level of the cell voltage plus the absolute value of the negatively biased voltage level, Vnb. This allows the converter 950 to operate at an efficient voltage level until the actual cell voltage drops to a voltage level below the minimum forward-bias voltage necessary to drive the ground bias circuit 980. Thus, the converter 950 may more efficiently draw a higher current level from the electrochemical cell 930 than it would be able to with only the cell voltage of the electrochemical cell 930 driving the converter 950. In a preferred embodiment of the controller 940 for a battery 910 of the present invention having an electrochemical cell with a nominal voltage of about 1.5 volts, the negatively biased voltage, Vnb, is preferably in the range between about 0 volts and about 1 volt. More preferably the negatively biased voltage, Vnb, is about 0.5 volts, with 0.4 volts being the most preferred. Therefore, the ground bias circuit 980 allows the converter to more deeply discharge the electrochemical cell 930 and increase the efficiency of the converter 950 in extracting the current from the electrochemical cell 930 when the cell voltage drops below about 1 volt for an electrochemical cell having a nominal voltage of about 1.5 volts.

Figure 9A:
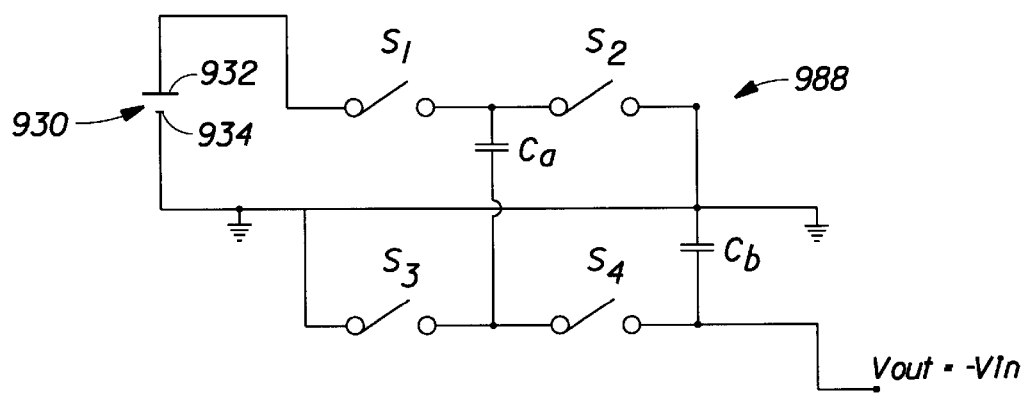
FIG. 9A is a schematic diagram of one embodiment of an aspect of the preferred embodiment of the battery of FIG. 9.

One exemplary embodiment of a charge pump 988 that may be used as a ground bias circuit 980 in a battery 910 of the present invention is shown in FIG. 9A. In this embodiment, when switches S1 and S3 are closed, and S2 and S4 are open, the cell voltage of the electrochemical cell 930 charges capacitor Ca. Then, when switches S1 and S3 are open, and S2 and S4 are closed, the charge on capacitor Ca is inverted and transferred to capacitor Cb, which provides an inverted output voltage from the cell voltage of the electrochemical cell 930. Alternatively, the charge pump 988 shown in FIG. 9A may be replaced by any suitable charge pump circuit known in the art.

Figure 9B:
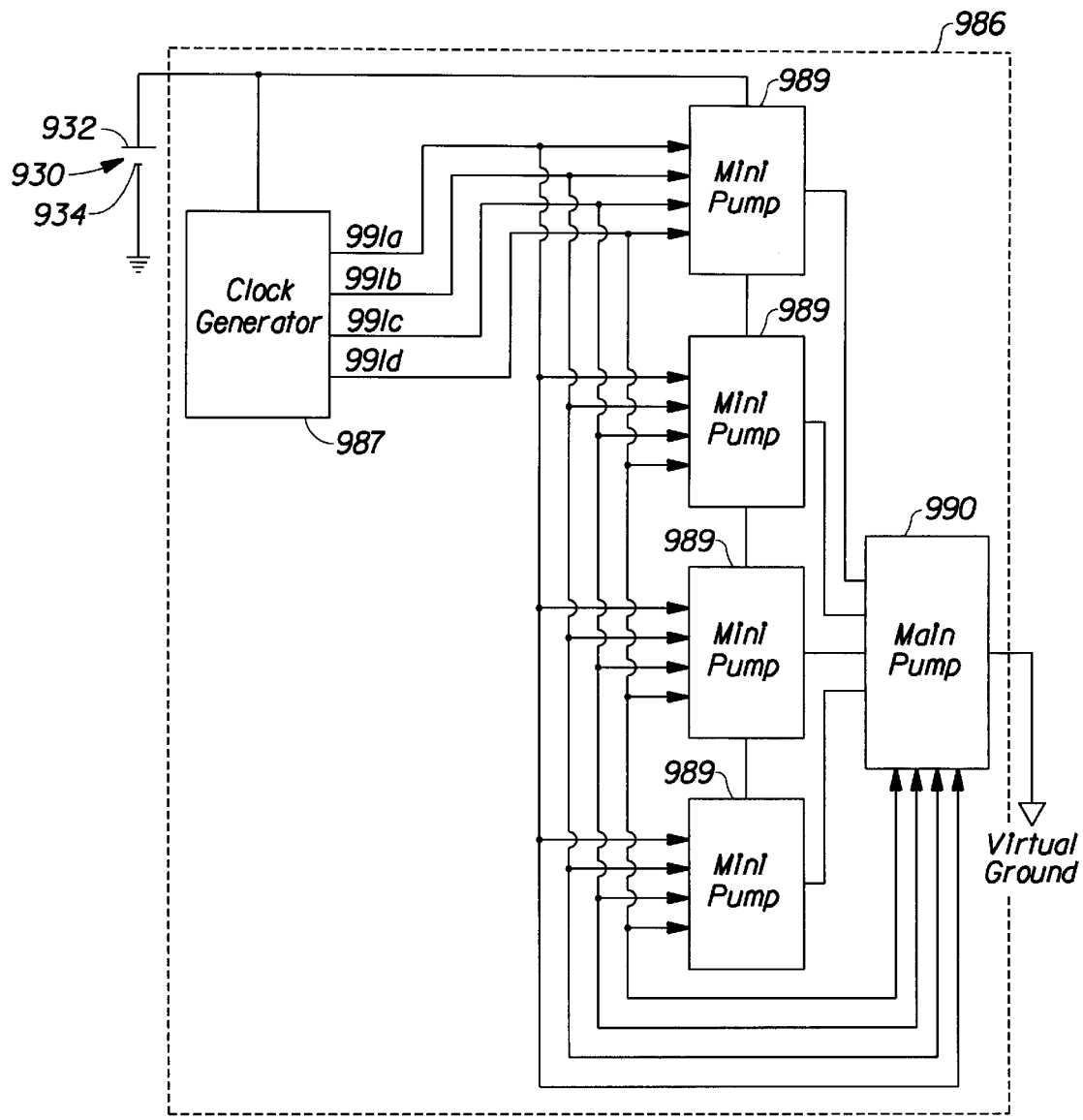
FIG. 9B is a block diagram of yet another preferred embodiment of an aspect of the preferred embodiment of the battery of FIG. 9.

In a preferred embodiment of the present invention, the ground bias circuit 980 includes a charge pump circuit 986. The charge pump circuit 986 is shown in FIG. 9B and includes a clock generator 987, and one or more pumps 988. In a preferred embodiment of the charge pump circuit 986 shown in FIG. 9B, for example, the charge pump includes a two-tiered configuration including four mini-pumps 989, and one main pump 990. Any number of mini-pumps 989, however, may be used. One preferred embodiment of charge pump circuit 986, for example, includes twelve mini-pumps 989 and one main pump. The mini-pumps 989 and the main pump 990 of this embodiment are driven by four different phased control signals, 991a, 991b, 991c, and 991d, generated by the clock generator 987 that each have the same frequency, but are shifted in phase from each other. The control signals 991a through 991d, for example, may be shifted in phase ninety degrees from each other. In this embodiment, each of the mini-pumps 989 provides an inverted output voltage of the controls signals 991a through 991d that are generated by the clock generator. The main pump 990 sums the outputs of the multiple mini-pumps 989 and provides an output signal for the charge pump circuit 986 that is at the same voltage level as the individual output voltages of the mini-pumps 989, but is at a higher current level that is the total of the current provided by all twelve of the mini-pumps 989. This output signal provides the virtual ground for the DC/DC converter 950 and the output negative terminal 922 of the container 912 (shown in FIG. 9).

In a further aspect of the invention, the charge pump circuit further includes a charge pump controller 992 that turns on the charge pump circuit 986 when the cell voltage drops to a predetermined voltage level in order to minimize losses associated with the charge pump circuit 986. The predetermined voltage level for the charge pump controller 992, for example, could be in the range from about the nominal voltage of the electrochemical cell 930 to the highest cut-off voltage of the group of electronic devices for which the battery 910 is designed to power. The predetermined voltage level is more preferably slightly greater than the highest cut-off voltage of the class of electronic devices for which the battery 910 is designed to power. For example, the predetermined voltage level is preferably about 0.2 volts greater than the highest cut-off voltage of the class of electronic devices for which the battery 910 is designed to operate. More preferably, the predetermined voltage level is about 0.15 volts greater than that cut-off voltage. Even more preferably, the predetermined voltage level is about 0.1 volts greater than that cut-off voltage, with about 0.05 volts greater than that cut-off voltage being the most preferred. Alternatively, the charge pump circuit 986 could be controlled by the same control signal that turns on the DC/DC converter 950 so that the charge pump circuit 986 operates only when the converter 950 is operating.

Further, when the ground bias circuit 980 is turned off, the virtual ground, which is applied to the output negative terminal 922 of the container 912, preferably collapses to the voltage level of the negative electrode 934 of the electrochemical cell 930. Thus, when the ground bias circuit is not operating, the battery operates in a standard ground configuration provided by the negative electrode 934 of the electrochemical cell 930.

Alternatively, the ground bias circuit 980 could comprise a second DC/DC converter such as a Buck-Boost converter, a Cuk converter, or a linear regulator. In addition, the DC/DC converter 950 and the ground bias circuit 980 can be combined and replaced by a single converter such as a Buck-Boost converter, a push-pull converter, or a flyback converter that will both shift the positive output voltage up and shift the negative bias down.

Figure 10:
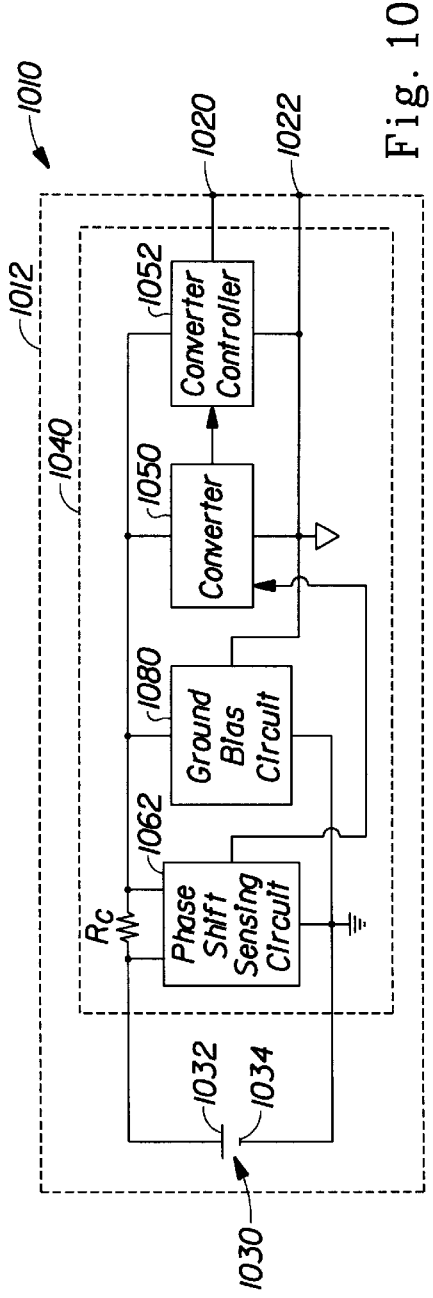
FIG. 10 is a block diagram of yet another preferred embodiment of a battery of the present invention.

FIG. 10 shows yet another embodiment of a controller circuit 1040 of the present invention. In this embodiment, the DC/DC converter 1050 is capable of accepting a correction control signal from an external source such as the phase shift sensing circuit 1062. As described above with reference to FIG. 7, the DC/DC converter 1050 utilizes a control scheme such as a pulse-width modulator to control the operating parameters of the converter 1050. In this embodiment, the controller circuit 1040 includes the same elements as the controller 940 shown in FIG. 9, but further includes a phase shift sensing circuit 1062 that measures the instantaneous phase shift, $\psi$, between the AC components of the cell voltage at electrode 1032 and the current being drawn from the electrochemical cell 1030 measured across current-sensing resistor Rc. The DC/DC converter 1050 uses this signal in combination with other internally or externally generated control signals to generate the duty cycle.

Figure 11:
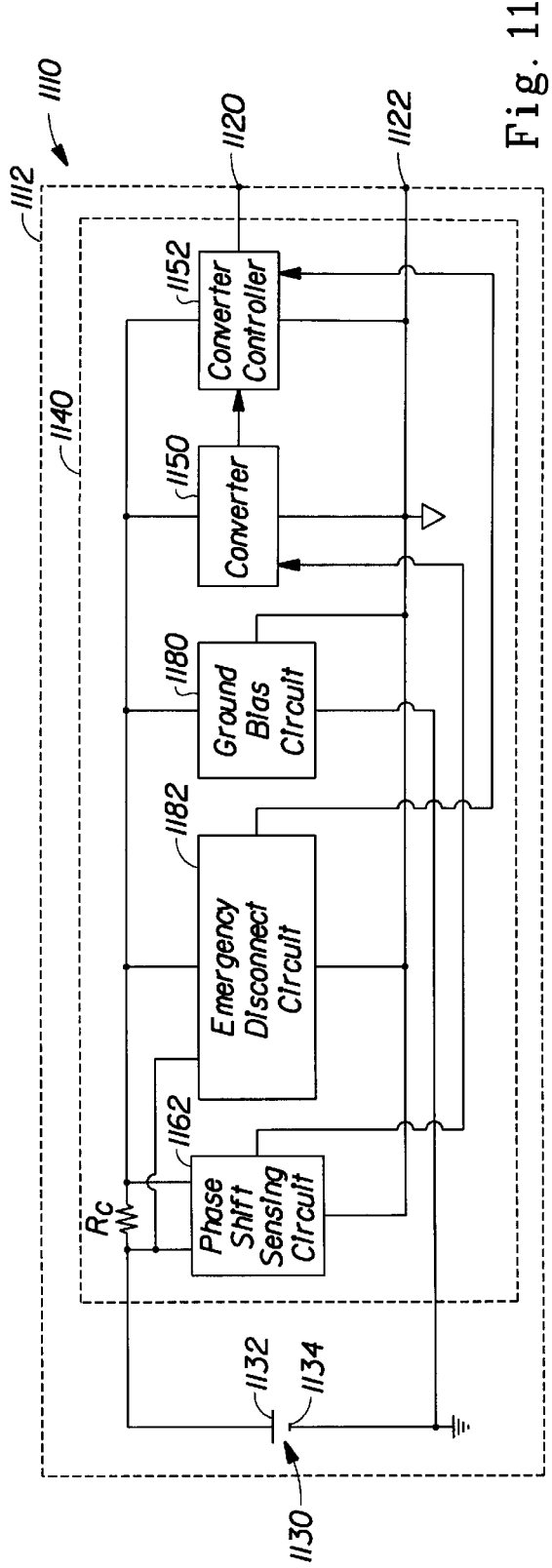
FIG. 11 is a block diagram of another preferred embodiment of a battery of the present invention.

The controller 1140 of the embodiment shown in FIG. 11 may include the same elements as the controller 1040 shown in FIG. 10, but further includes an emergency disconnect circuit 1182 electrically connected to the current-sensing resistor Rc, and the positive 1132 and the negative 1134 electrodes of the electrochemical cell 1130, and further connected to the converter controller 1152. The emergency disconnect circuit 1182 can signal to the converter controller 1152 one or more safety-related conditions requiring disconnect of the electrochemical cell(s) 1130 from the output terminals 1120 and 1122 of the container 1112 to protect the consumer, an electrical or electronic device, or the electrochemical cell itself. For example, in the event of a short-circuit or inverse polarity, the emergency disconnect circuit 1182 signals the converter controller 1152 to disconnect the electrodes 1132 and 1134 of the electrochemical cell 1030 from the terminals 1120 and 1122 of the container 1112. In addition, the emergency disconnect circuit 1182 can also provide an indication of the end of the discharge cycle of the electrochemical cell 1130 to the converter controller 1152 by sensing the voltage and/or the internal impedance of the electrochemical cell 1130. For example, the controller 1140 may ramp down the current when the remaining capacity of the electrochemical cell 1130 falls to a predetermined level, intermittently disconnect and reconnect the electrodes 1132 and 1134 of the electrochemical cell 1130 from the output terminals 1120 and 1122 for a short duration when the remaining capacity of the electrochemical cell 1130 reaches a predetermined value, or provide some other visible, audible or machine readable indication that the battery 1110 is about to shut down. At the end of the discharge cycle, the emergency disconnect circuit may also send a signal to the converter controller 1152 to disconnect the electrochemical cell 1130 from the terminals 1120 and 1122 of the container 1112 and/or to short the output terminals 1120 and 1122 to prevent the discharged electrochemical cell 1130 from consuming the current of other cells connected in series with the discharged electrochemical cell 1130.

Figure 12:
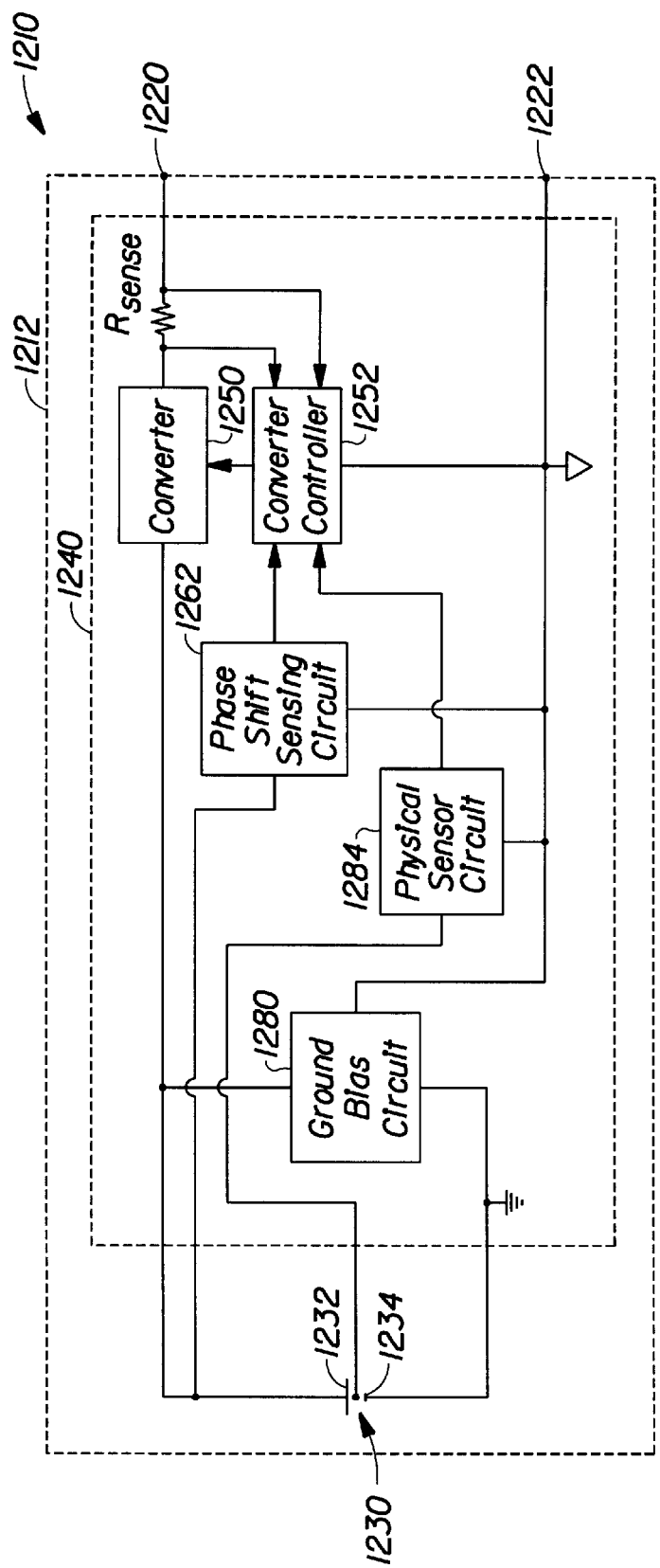
FIG. 12 is a block diagram of yet another preferred embodiment of a battery of the present invention.

A preferred controller 1240 that is shown in FIG. 12 includes a DC/DC converter 1250 having a synchronous rectifier 1274 that can electronically connect and disconnect the positive electrode 1232 from the positive terminal 1220 of the container 1212. The switch of the synchronous rectifier 1274 eliminates the need for an additional switch such as the converter controller 852, which is described above with respect to FIG. 8, in the direct electrical path between the positive 1232 or the negative 1234 electrodes of the electrochemical cell 1230 and the output terminals 1220 and 1222 of the container. Additionally, the synchronous rectifier 1274 increases the efficiency of the DC/DC converter 1250 by reducing the internal losses. The converter controller 1252 of this embodiment also allows for additional input signals for the control of the DC/DC converter 1250. For example, in the embodiment shown in FIG. 12, the converter controller 1252 monitors the internal electrochemical cell environment via sensors such as temperature, pressure, and hydrogen and oxygen concentration in addition to the phase shift measurements described earlier with respect to FIG. 10.

FIGS. 7–12 show progressively more complex circuit designs of the present invention. They are given in this order to provide an orderly description of different elements that may be included in an integrated controller circuit in addition to the DC/DC converter that is the central element of the controller of the present invention. The order of presentation is not meant to imply that the elements introduced later in circuits combining multiple different elements must have all the features described with respect to the previous Figures in order to be within the scope of the present invention. An emergency disconnect circuit, a charge indicator circuit, a phase sensing circuit, and/or a ground bias circuit, for example, may be used in combination with the circuits of FIGS. 6–11 without the converter controller or other elements shown in the Figures that show these elements.

Figure 13:
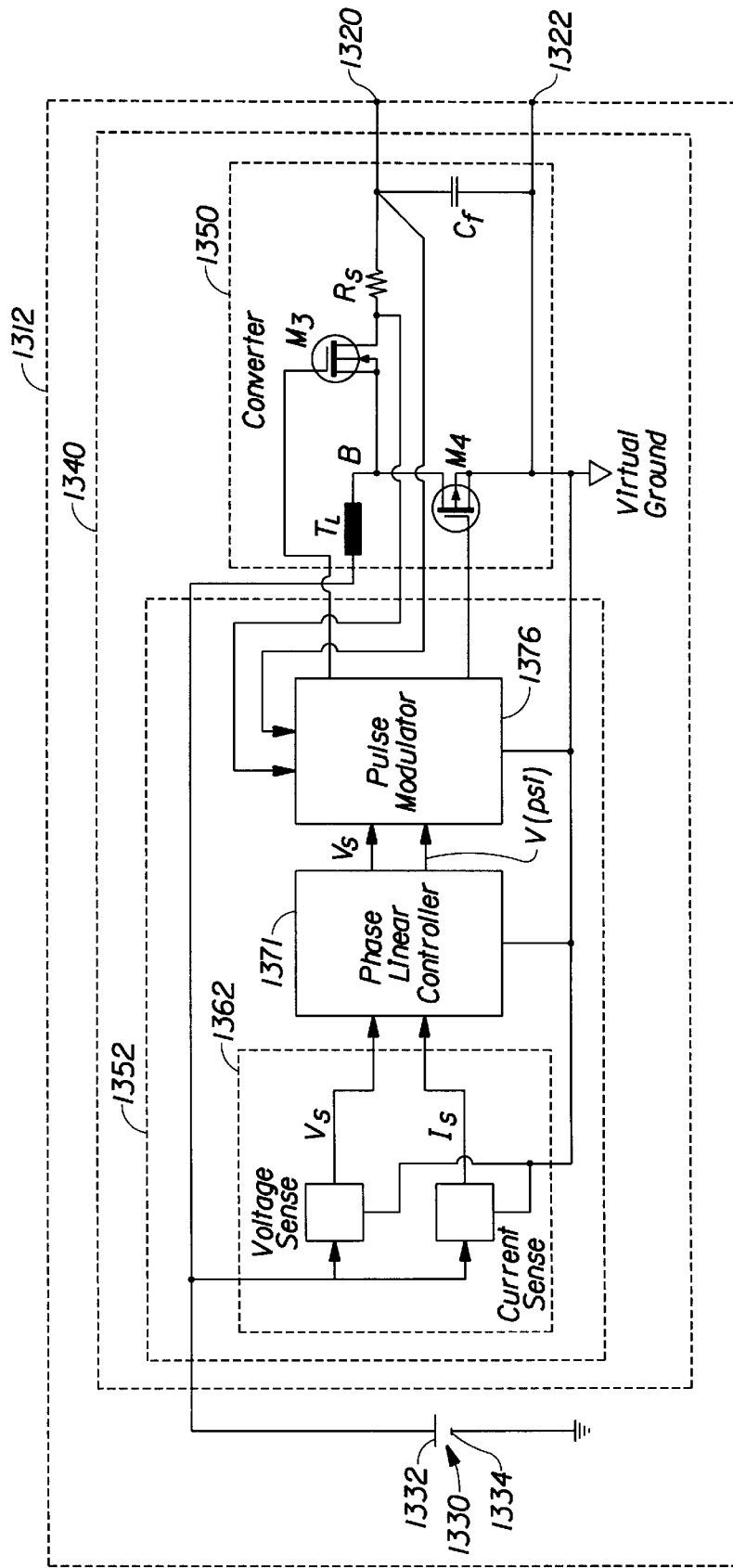
FIG. 13 is a combination of a block and a schematic diagram of another preferred embodiment of the present invention.

A preferred embodiment of the integrated controller circuit 1340 for use in a battery 1310 of the present invention includes the DC/DC converter 1350 and the converter controller 1352 and is shown in FIG. 13. The converter 1350 is preferably an almost inductorless, high frequency, high efficiency, and medium power converter that can operate below the threshold voltage of most electronic devices. The controller 1340 preferably includes a charge pump such as the one shown in FIG. 9B to supply a virtual ground that has a potential below that of the negative electrode 1334 of the electrochemical cell 1330 to the DC/DC converter 1350 and the output terminal 1322 of the container 1312. The virtual ground provides an increased voltage differential available to drive the DC/DC converter 1350 and allows the converter 1350 to more efficiently draw a higher current level from the electrochemical cell 1330 than it would be able to with only the cell voltage driving the converter.

In this embodiment, the converter controller 1352 preferably utilizes a pulse-width and pulse-phase modulation control scheme. The phase shift sensing circuit 1362 measures the cell voltage and the current drawn from the electrochemical cell 1330 at the positive 1332 and the negative 1334 electrodes of the electrochemical cell 1330 and the instantaneous and/or continuous phase shift between the voltage and the current. This phase shift defines the internal impedance of the electrochemical cell 1330, which is a function of charge capacity of the electrochemical cell 1330. After about 50% discharge of the electrochemical cell 1330, which is determined by the cell closed-circuit voltage drop, the increasing internal impedance indicates the remaining electrochemical cell 1330 capacity. The phase shifting sensing circuit 1362 provides these signals to the phase linear controller 1371. The phase linear controller 1371 then provides the voltage Vs sensed by the phase shift sensing circuit 1362 and an output voltage control signal V(psi) that is linearly proportional to the phase shift to the pulse modulator 1376 that utilizes a combination of pulse-width modulation and pulse-phase modulation control schemes. The pulse modulator 1376 also receives the voltage drop across the resistor Rs as a voltage control signal.

The pulse modulator 1376 uses the voltage control signals in combination to drive the DC/DC converter 1350. When the voltage Vs is above a predetermined threshold voltage level, the pulse modulator 1376 maintains the metal-oxide semiconductor field-effect transistor ("MOSFET") M3 in a closed state and the MOSFET M4 in an open state. Thus, the current path from the electrochemical cell 1330 to the load is maintained via MOSFET M3. In addition, the losses associated with the DC/DC converter 1350 and the converter controller 1352 are minimized because the duty cycle is effectively maintained at zero percent. In this case, the DC losses of the closed MOSFET M3 and the resistor Rs are extremely low. The resistor Rs, for example, is preferably in the range from about 0.01 to about 0.1 ohms.

When the voltage $V_s$ is below a predetermined threshold voltage level, however, the pulse modulator 1376 is turned on and modulates the duty cycle of the DC/DC converter 1350 based upon the combination of the voltage control signals. The amplitude of Vs operates as the primary control signal that controls the duty cycle. The voltage drop across the current sense resistor Rs, which is a function of the output current, operates as the second control signal. Finally, the signal V(psi) generated by the phase linear controller 1371, which is linearly proportional to the phase shift between the AC components of the cell voltage and the current being drawn from the electrochemical cell 1330, is the third control signal. In particular, the V(psi) signal is used to alter the duty cycle in response to the internal impedance changes over the battery service run time, which affects the efficiency of the converter and the battery service run time. The pulse modulator increases the duty cycle if the instantaneous and/or continuous amplitude of Vs decreases, or if the voltage drop across the resistor Rs increases, and/or the instantaneous and/or continuous amplitude of the V(phi) control signal increases. The contribution of each variable is weighted according to an appropriate control algorithm.

When the pulse modulator 1376 is turned on, its oscillator generates trapezoidal or square wave control pulses that preferably have a 50% duty cycle and a frequency in the range from about 40 KHz to about 1 MHz, more preferably in the range from about 40 KHz to about 600 KHz, with about 600 KHz generally being the most preferred. The pulse modulator 1376 alters the duty cycle of the output control signal for the MOSFETs M3 and M4 utilizing an appropriate control algorithm. Most generally, the control algorithm operates M3 and M4 with the same duty cycle but the opposite phase. The MOSFETs M3 and M4 are preferably complementary high power transistors in which M3 is preferably an N-channel MOSFET, and M4 is preferably a P-channel MOSFET. In essence, the configuration of the complete DC/DC converter 1350 is a boost DC/DC converter with a synchronized rectifier at the output. In addition, the converter 1350 minimizes AC and DC losses by using MOSFET M3 instead of a non-synchronous Schottky diode. Separate control signals drive M3 and the power MOSFET M4. Altering the phase and/or the duty cycle between the M3 and M4 control signals alters the output voltage across the terminals 1320 and 1322 of the container 1312.

The pulse modulator 1376 may control the MOSFETs M3 and M4 based upon one or more voltage control signals such as the voltage Vs, the voltage drop across the resistor Rs, or the internal impedance of the electrochemical cell 1330. If the load current consumption is low, for example, the pulse modulator 1376 generates a duty cycle of the DC/DC converter 1350 close to zero percent. If the load current consumption is high, however, the pulse modulator 1376 generates a duty cycle of the DC/DC converter 1350 close to 100%. As the load current consumption varies between these two endpoints the pulse modulator 1376 varies the duty cycle of the DC/DC converter in order to supply the current required by the load.

Figure 14:
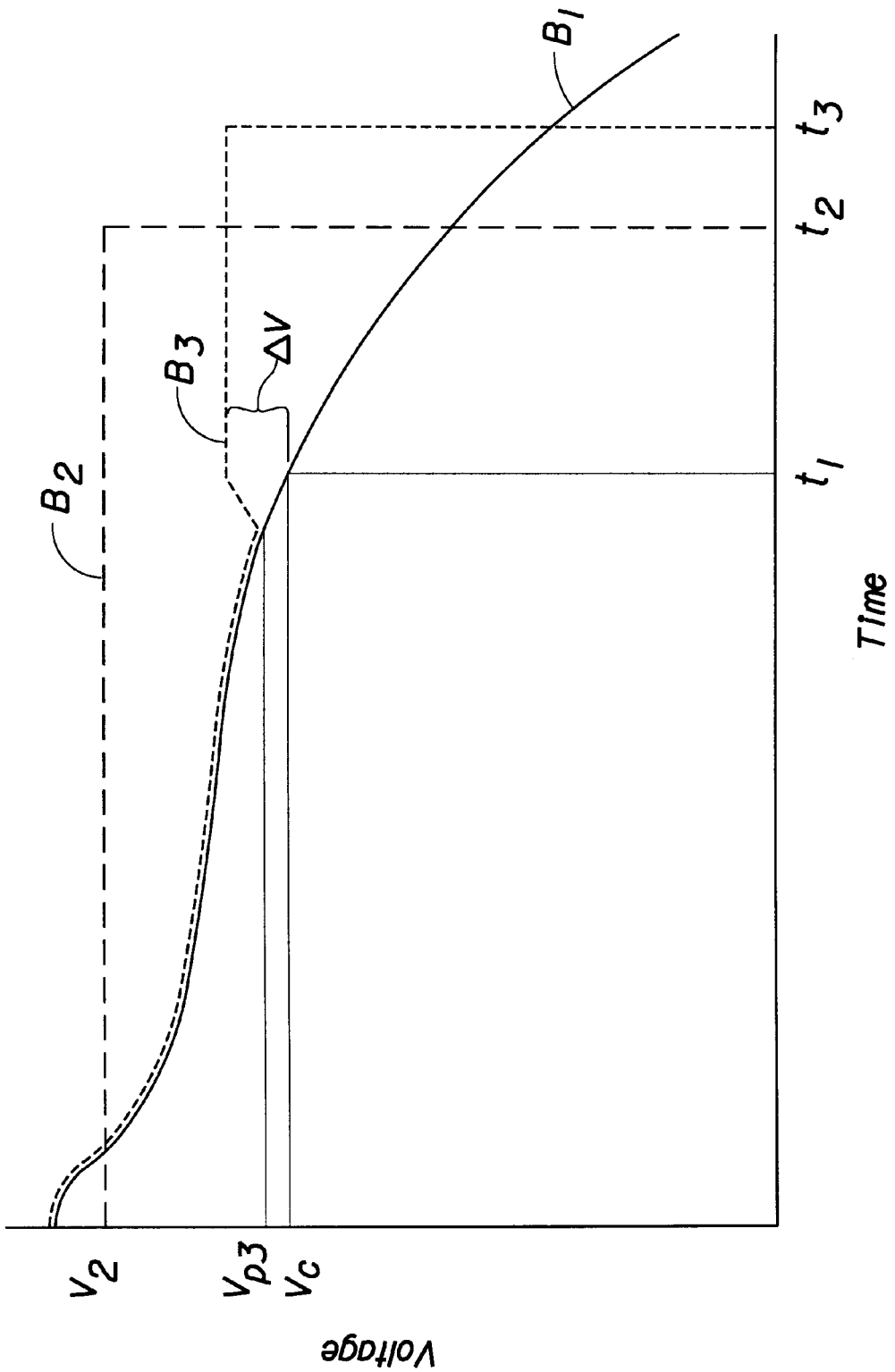
FIG. 14 is a graph of discharge characteristic curves for a typical battery and two different preferred embodiments of batteries of the present invention.

FIG. 14 compares exemplary discharge curves for a battery B1 that does not have a controller of the present invention, a battery B2 of the present invention having a controller in which the converter that operates in a continuous mode, and a battery B3 of the present invention, having a controller in which the converter turns on above the cut-off voltage of the battery for a given electronic device for which that battery is designed. As shown in FIG. 14, the battery B1 that does not have a controller of the present invention will fail in an electronic device that has a cut-off voltage Vc at time t1. The controller of the battery B2, however, continuously boosts the output voltage of the battery to voltage level V2 throughout the service run time of the battery. When the cell voltage of the electrochemical cell of battery B2 falls to voltage level Vd, the minimum operating voltage of the controller, the controller of battery B2 will shut down and the battery output voltage drops to zero at time t2, ending the effective service run time of the battery B2. As shown in the graph of FIG. 14, the effective service run time extension of the battery B2 having a controller in which the converter operates in a continuous mode is t2–t1.

The controller of the battery B3, however, does not begin to boost the output voltage of the battery until the cell voltage of the electrochemical cell reaches a predetermined voltage level Vp3. The predetermined voltage level Vp3 is preferably in the range between the nominal voltage level of the electrochemical cell and the highest cut-off voltage of the class of electronic devices that the battery is intended to power. More preferably, the predetermined voltage level Vp3 is about 0.2 volts greater than the highest cut-off voltage, Vc, of the class of electronic devices that the battery is intended to power. Even more preferably, the predetermined voltage level Vp3 is about 0.15 volts greater than the highest cut-off voltage, Vc, of the class of electronic devices that the battery is intended to power. Yet even more preferably, the predetermined voltage level Vp3 is about 0.1 volts greater than the highest cut-off voltage, Vc, of the class of electronic devices that the battery is intended to power, with about 0.05 volts greater than Vc being the most preferred. When the cell voltage reaches the predetermined voltage level Vp3, the converter of battery B3 begins to boost or stabilize the output voltage to a level of Vc+$\Delta$V. The voltage level $\Delta$V is depicted in FIG. 14 and represents the voltage difference between the boosted output voltage of the battery B3 and the cut-off voltage Vc. The voltage level $\Delta$V is preferably in the range from about 0 volts to about 0.4 volts, with about 0.2 volts being more preferred. Battery B3 then continues to provide an output until the cell voltage of the electrochemical cell falls to voltage level Vd, the minimum operating voltage of the converter, the controller of battery B3 will shut down. At this time, the battery output voltage drops to zero at time t3, ending the effective service run time of the battery B3. As shown in the graph of FIG. 14, the effective service run time extension of the battery B3 over the battery B1 that does not have a controller of the present invention is t3–t1.

FIG. 14 also shows that the battery B3 will outlast the battery B2 when they are connected to the same electronic device. Because the converter of battery B2 operates continuously, the internal losses of the converter consume some of the energy capacity of the electrochemical cell of battery B2, and, therefore, the cell voltage of battery B2 will reach the minimum operating voltage of the converter Vd in a shorter time compared to the battery B3 in which the controller is operational for only a portion of the discharge cycle. Thus, optimizing the selection of the predetermined voltage Vp3 of battery B3 as close to the cut-off voltage of the electronic device that it is powering will result in the most efficient usage of the electrochemical cell and result in a greater battery service run time extension. Thus the predetermined voltage Vp3 of the battery B3 is preferably equal to or slightly greater than the cut-off voltage of the electronic or electric device that it is intended to power. For example, the predetermined voltage Vp3 may preferably be about 0.2 volts greater than the cut-off voltage. More preferably, the predetermined voltage Vp3 may preferably be about 0.15 volts greater than the cut-off voltage. Even more preferably, the predetermined voltage Vp3 may preferably be about 0.1 volts greater than the cut-off voltage, with about 0.05 volts greater than the cut-off voltage being the most preferred.

If the battery is designed as a standard battery for a variety of electronic devices, however, the predetermined voltage Vp3 is preferably selected to be equal to or slightly greater than the highest cut-off voltage of that group of electronic devices. For example, the predetermined voltage Vp3 may preferably be about 0.2 volts greater than the highest cut-off voltage of that group of electronic devices. More preferably, the predetermined voltage Vp3 may preferably be about 0.15 volts greater than the highest cut-off voltage of that group of electronic devices. Even more preferably, the predetermined voltage Vp3 may preferably be about 0.1 volts greater than the highest cut-off voltage of that group of electronic devices, with about 0.05 volts greater than the highest cut-off voltage of that group of electronic devices being the most preferred.

The graphs of FIG. 14 also show that the lower the minimum operating voltage of the converter Vd, the greater the service run time extension will be compared to battery B1 that does not have a controller of the present invention. In addition, the greater the difference between the cut-off voltage of the electronic device, Vc, and the minimum operating voltage of the converter, Vd, the controller of the present invention will provide a greater service run time extension of the battery due to the boosting of the cell voltage of the electrochemical cell.

What is claimed is:

1. A primary battery useful with a device having a cut-off voltage, the primary battery comprising:
    (a) a container having a positive terminal and a negative terminal;
    (b) a primary electrochemical cell disposed within said container, said cell having a positive electrode, a negative electrode, a cell voltage measured across said positive and said negative electrodes of said cell, and a nominal voltage; and
    (c) a controller electrically connected between said electrodes of said cell and said terminals of said container to create an output voltage measured across said positive and said negative terminals of said container, said controller including a converter adapted to operate at a cell voltage less than the cut-off voltage of the device, such that said controller extends the run time of the battery by converting said cell voltage to said output voltage, so that said output voltage is greater than the cut-off voltage of the device.

2. The primary battery of claim 1, wherein the primary battery is selected from the group consisting of a single-cell battery, a universal single-cell battery, a multiple-cell battery and a multiple-cell hybrid battery.

3. The primary battery of claim 1, wherein the primary battery is adapted to be electrically connected as one of an integer number of batteries in series with the device, said output voltage being greater than or equal to the cut-off voltage of the device divided by said integer number of batteries.

4. The primary battery of claim 1, wherein the primary battery is a multiple-cell battery, said primary battery further comprising a positive output terminal and a negative output terminal; said container, said cell and said controller forming a first cell unit; said first cell unit being one of an integer number of cell units electrically connected in series between said positive output terminal and said negative output terminal, said output voltage being greater than or equal to the cut-off voltage of the device divided by said integer number of cell units.

5. The primary battery of claim 1, wherein said controller can regulate said cell voltage down to at least about 0.6 volts.

6. The primary battery of claim 1, wherein said controller is adapted to electrically connect said converter between said electrodes of said cell and said terminals of said container when said cell voltage falls to a predetermined voltage level.

7. The primary battery of claim 6, wherein said nominal voltage of said cell is about 1.5 volts, and said predetermined voltage level is in the range from about 0.8 volts to about 1.2 volts.

8. The primary battery of claim 6, wherein said predetermined voltage level is in the range from the cut-off voltage of the device to the cut-off voltage of the device plus about 0.2 volts.

9. The primary battery of claim 6, wherein said predetermined voltage level is in the range from the cut-off voltage of the device to about said nominal voltage of said cell.

10. The primary battery of claim 6, wherein said nominal voltage of said cell is about 1.5 volts and said controller is adapted to allow a deep discharge of said cell when the cut-off voltage of the device is 1 volt.

11. The primary battery of claim 6, wherein said cell is a lithium cell, and said controller allows said lithium cell to be at least about 90% discharged when the cut-off voltage of the device is 2.4 volts.

12. The primary battery of claim 1, wherein said converter further comprises:
    (i) a control circuit electrically connected to said positive and said negative electrodes of said cell;
    (ii) a DC/AC driver electrically connected to said control circuitry; and
    (iii) a synchronous rectifier electrically connected to said DC/AC driver and to said positive and said negative terminals of said container.

13. The primary battery of claim 12, wherein said controller further comprises:
    (iv) a ground bias circuit electrically connected to said positive and said negative electrodes of said cell, said ground bias circuit providing a virtual ground to said converter and to said negative terminal of said container.

14. The primary battery of claim 13, wherein said ground bias circuit includes a charge pump circuit.

15. The primary battery of claim 13, wherein said virtual ground is a voltage level below the voltage level of said negative electrode of said cell.

16. The primary battery of claim 12, wherein said control circuit further comprises a pulse modulator.

17. The primary battery of claim 16, wherein said pulse modulator includes a pulse-width modulator having at least one input control signal.

18. The primary battery of claim 17, wherein said pulse modulator is adapted to electronically disconnect said converter from said cell and to electronically connect said converter to said cell.

19. The primary battery of claim 18, wherein said pulse modulator is adapted to electronically disconnect said converter from said cell and to electronically connect said converter to said cell based at least in part on one or more control signals selected from the group of an internal impedance of said cell, a drain current, and said output voltage.

20. The primary battery of claim 18, wherein said pulse modulator is adapted to electronically connect said converter between said electrodes of said cell and said terminals of said container when said cell voltage falls to a predetermined voltage level.

21. The primary battery of claim 20, wherein said predetermined voltage level is in the range from the cut-off voltage of the device to about said nominal voltage of said cell.

22. A primary battery comprising:
(a) a container having a positive terminal and a negative terminal;
(b) a primary electrochemical cell disposed within said container, said cell having a positive electrode, a negative electrode, a cell voltage measured across said positive and said negative electrodes of said cell, and a nominal voltage; and
(c) a controller electrically connected between said electrodes of said cell and said terminals of said container to create an output voltage measured across said positive and said negative terminals of said container, said controller including a converter that converts said cell voltage to said output voltage, so that said output voltage is less than said nominal voltage of said cell.

23. The primary battery of claim 22, wherein the primary battery is selected from the group consisting of a single-cell battery, a universal single-cell battery, a multiple-cell battery and a multiple-cell hybrid battery.

24. The primary battery of claim 22, wherein said nominal voltage is greater than about 1.5 volts.

25. The primary battery of claim 24, wherein said cell is a lithium cell, said nominal voltage of said cell is in the range from about 2.8 volts to about 4.0 volts, and said controller steps down said cell voltage so that said output voltage is in the range from about 1.0 volts to about 1.6 volts.

26. A primary battery comprising:
(a) a container having a positive terminal and a negative terminal;
(b) a primary electrochemical cell disposed within said container, said cell having a positive electrode, a negative electrode, and a cell voltage measured across said positive and said negative electrodes of said cell; and
(c) a controller electrically connected between said electrodes of said cell and said terminals of said container to create an output voltage measured across said positive and said negative terminals of said container, said controller including a converter that converts said cell voltage to said output voltage and a capacitor that provides storage of electrical charge to protect said cell from current peaks.

27. The primary battery of claim 26, wherein the primary battery is selected from the group consisting of a single-cell battery, a universal single-cell battery, a multiple-cell battery and a multiple-cell hybrid battery.

28. A device including at least one primary battery, said device comprising:
(a) a positive input terminal;
(b) a negative input terminal electrically connected to said positive input terminal;
(c) a cut-off voltage; and
(d) a primary battery having a run time, said primary battery comprising:
(i) a container having a positive output terminal electrically connected to said positive input terminal of said device and a negative output terminal electrically connected to said negative input terminal of said device,
(ii) a primary electrochemical cell disposed within said container, said cell having a positive electrode, a negative electrode, a cell voltage measured across said positive and said negative electrodes of said cell, and a nominal voltage, and
(iii) a controller electrically connected between said electrodes of said cell and said output terminals of said container to create an output voltage measured across said positive and said negative output terminals of said container, said controller including a converter adapted to operate at a cell voltage less than the cut-off voltage of the device;
said controller adapted to extend said run time of said battery by converting said cell voltage to said output voltage so that said output voltage is greater than said cut-off voltage of said device.

29. The device of claim 30, wherein said primary battery is one of an integer number of batteries being electrically connected in series between said positive input terminal of said device and said negative input terminal of said device, said output voltage being greater than or equal to said cut-off voltage of said device divided by said integer number of said batteries.

30. The device of claim 28, wherein said primary battery is a multiple-cell battery, said primary battery further comprising a positive battery output terminal and a negative battery output terminal; said container, said cell and said controller form a first cell unit; said first cell unit being one of an integer number of cell units electrically connected in series between said positive battery output terminal and said negative battery output terminal, said output voltage being greater than or equal to the cut-off voltage of the device divided by said integer number of cell units.

31. A method for extending the run time of a primary battery, said method comprising the steps of:
(a) providing a primary battery including:
(i) a container having a positive terminal and a negative terminal;
(ii) an electrochemical cell disposed within said container, said cell having a positive electrode, a negative electrode, a cell voltage measured across said positive electrode and said negative electrode of said cell, and a nominal voltage; and
(iii) a controller electrically connected between said electrodes of said cell and said terminals of said container to create an output voltage measured across said positive terminal and said negative terminal of said container, said controller including a converter;
(b) electrically connecting said primary battery to a device having a cut-off voltage;
(c) converting said cell voltage to said output voltage, so that said output voltage is greater than the cut-off voltage of the device.

* * * * *